US007761809B2

(12) United States Patent
Bukovec et al.

(10) Patent No.: US 7,761,809 B2
(45) Date of Patent: Jul. 20, 2010

(54) TARGETED USER INTERFACE FALL-THROUGH

(75) Inventors: Mai-Ian Tomsen Bukovec, Seattle, WA (US); Eric B. Watson, Redmond, WA (US); Eric C. Kool-Brown, Seattle, WA (US); Thomas William Keane, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 500 days.

(21) Appl. No.: 11/395,873

(22) Filed: Mar. 30, 2006

(65) Prior Publication Data

US 2007/0234210 A1 Oct. 4, 2007

(51) Int. Cl.
G06F 9/00 (2006.01)
G06F 3/00 (2006.01)
G05B 15/00 (2006.01)
(52) U.S. Cl. .................. 715/810; 715/749; 715/734
(58) Field of Classification Search .................. 715/810, 715/749, 780, 734
See application file for complete search history.

(56) References Cited

U.S. PATENT DOCUMENTS

| 6,073,109 | A |   | 6/2000 | Flores et al. | |
| 6,115,646 | A | * | 9/2000 | Fiszman et al. | 700/181 |
| 6,266,805 | B1 | * | 7/2001 | Nwana et al. | 717/104 |
| 6,523,035 | B1 |   | 2/2003 | Fleming et al. | |
| 6,948,135 | B1 |   | 9/2005 | Ruthfield et al. | |
| 6,978,422 | B1 | * | 12/2005 | Bushe et al. | 715/734 |
| 6,996,778 | B2 | * | 2/2006 | Rajarajan et al. | 715/734 |
| 2001/0044738 | A1 |   | 11/2001 | Elkin et al. | |
| 2004/0024843 | A1 | * | 2/2004 | Smith | 345/749 |
| 2004/0036709 | A1 | * | 2/2004 | Albaugh et al. | 345/700 |
| 2004/0093350 | A1 |   | 5/2004 | Alexander et al. | |
| 2005/0010871 | A1 |   | 1/2005 | Ruthfield et al. | |
| 2005/0177803 | A1 |   | 8/2005 | Ruthfield et al. | |
| 2007/0011618 | A1 | * | 1/2007 | Maron | 715/749 |

OTHER PUBLICATIONS

Corazza, S, Network Management Ssytem Grahical Interface, 1992, IEE Electronic Library Online, p. 135.*
Chess et al., "Itinerant Agents for Mobile Computing," IEEE Personal Communications, <http://www.comsoc.org/livepubs/surveys/public/3q00issue/Parris.pdf>, 16 pages (Oct. 1995).
BMC Software, "Easily Integrating the Tivoli Enterprise Console with AR System Applications," <http://www.remedy.com/solutions/documents/datasheets/Remedy_ARSystem_Tivoli_ds_en.pdf>, 4 pages (accessed Jan. 5, 2006).

(Continued)

*Primary Examiner*—William L Bashore
*Assistant Examiner*—Jordany Núñez
(74) *Attorney, Agent, or Firm*—Klarquist Sparkman, LLP

(57) ABSTRACT

Targeted user interfaces of managed applications can be displayed in a number of ways. Targeted user interfaces can be displayed, at a management computer server, based on task templates associated with tasks selected in a user interface of a management application running on the management computer server. Targeted user interfaces can be displayed, at a management computer server, based on a chosen task template associated with a task selected in a user interface of a management application running on the management computer server. A task template can be chosen from one or more task templates associated with a selected task. Objects can be displayed in a user interface of a management application, and based on a selection of an object, tasks can be displayed.

15 Claims, 18 Drawing Sheets

OTHER PUBLICATIONS

SoftTree Technologies, Inc., "24×7 Automation Suite—The art of computer automation," <http://www.softtreetech.com/24×7/24×7as.htm>, 3 pages (accessed Jan. 5, 2006).

Nastansky and Hilpert, "The GroupFlow Framework: Enterprise Model and Architecture of the Workflow System," <http://gcc.uni-paderborn.de/www/WI/WI2/wi2_lit.nsf/0/dcf3f38f4db48b08412564ed00582f22/$FILE/ATTZW0XF/9406GFEM.PDF>, 23 pages (Apr. 1994).

Microsoft Corporation, "Windows Small Business Server 2003: Frequently Asked Questions," <http://www.microsoft.com/windowsserver2003/sbs/techinfo/overview/generalfaq.mspx>, 20 pages (accessed Jan. 30, 2006).

Microsoft Corporation, "Windows Small Business Server 2003 Big Breakthroughs for Small Businesses," <http://rad.microsoft.com/ADSAdClient31.dll?GetAd=&PG=CMSSB1&SC=F3&AP=1164>, 35 pages (accessed Jan. 30, 2006).

Hewlett-Packard Development Company, "Instructions for installing Microsoft Windows Small Business Server 2003 with Service Pack 1 on HP ProLiant and tc servers," <http://h20000.www2.hp.com/bc/docs/support/SupportManual/c00208458/c00208458.pdf>, 12 pages (accessed Jan. 30, 2006).

* cited by examiner

TASK TEMPLATE SCHEMA

• TASK NAME
• UNIQUE IDENTIFIER
• GROUP
• SOURCE
• LOCATION
• AUXILIARY 1
• AUXILIARY 2

1310

TARGETED USER INTERFACE FALL-THROUGH

BACKGROUND

Despite advances in technology, managing software can be difficult. For example, a customer can purchase a software package with various applications from a software manufacturer. The customer can then install the various applications on various computer servers of the customer's network.

In order to manage one of the various applications, the customer may have to go to the server running the application, log in, launch the application, and navigate through various user interfaces of the application in order to find the specific user interface the user needs. In order to manage another one of the various applications, the customer may have to go to a different server, log in, launch the application, and navigate through the user interface. This can be a time-consuming an inefficient process.

Furthermore, a customer may not know which user interface in which application the customer needs to access in order to perform a specific job, such as to solve a problem. Even if the customer knows which application to use, the customer may not know how to navigate to the desired user interface within the application.

Therefore, there exists ample room for improvement in technologies related to managing software.

SUMMARY

A variety of technologies related to displaying user interfaces of managed applications can be applied. Such technologies can be used for displaying a targeted user interface of a managed application. For example, one or more tasks can be displayed in a user interface of a management application running on a management computer server. A selection of one of the tasks can be received via the user interface. The targeted user interface can be displayed, at the management computer server, based on a task template associated with the selected task. As part of displaying the targeted user interface, user interface identifiers and context identifiers can be passed to the managed application.

Such technologies can be used to display a targeted user interface of a managed application at a management computer server. For example, one or more tasks can be displayed in a user interface of a management application running on the management computer server. A selection of one of the tasks can be received via the user interface. A task template associated with the selected task can be chosen (e.g., a task template from a number of task templates associated with the selected task). The targeted user interface can be displayed, at the management computer server, based on the chosen task template. For example, a task template can be chosen based on status information or task rules.

Such technologies can also be used for managing a managed application from a management computer server by displaying a targeted user interface of the managed application at the management computer server. For example, a user can select an object from one or more objects displayed in a user interface of a management application running on the management computer server. One or more tasks associated with the object can then be displayed, and a selection of one of the tasks received. A task template can be chosen from one or more task templates associated with the selected task. The targeted user interface can be displayed, at the management computer server, based on the chosen task template.

The foregoing and other objects, features, and advantages of the invention will become more apparent from the following detailed description, which proceeds with reference to the accompanying figures.

DETAILED DESCRIPTION OF EXEMPLARY EMBODIMENTS

Example 1

Exemplary Task

Figure 1:
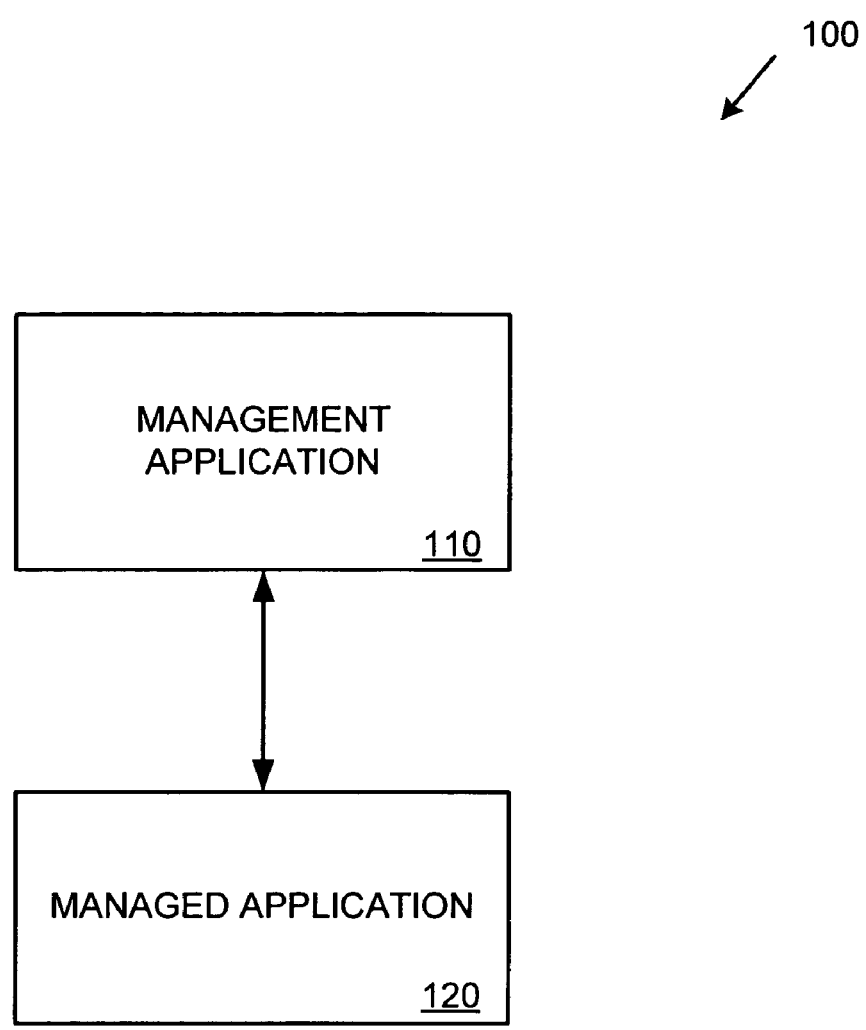
FIG. 1 is a diagram showing an exemplary system for displaying a user interface of a managed application.

In any of the examples herein, a task can represent work that is performed on a computer network (e.g., a multi-server computer environment of a business or organization). For example, a task can represent the retrieval of information that is displayed to a user of the network (e.g., for troubleshooting purposes). A task can also represent making a change to the network (e.g., changing settings in an application). A task can be performed, for example, by using a task template. For display purposes, a user interface element (e.g., a button, link) can be displayed for initiating a task.

Selecting (e.g., invoking) a task can result in displaying a user interface for accomplishing (e.g., completing) the task. For example, selecting a task can result in display of a targeted user interface of a managed application (e.g., using a task template associated with the selected task and identifying the targeted user interface).

Selecting a task can result in display of various types of user interfaces. For example, a wizard user interface can be displayed (e.g., where the user is directed through a series of step). A dialog can be displayed (e.g., the user can be asked to confirm the deletion of a user account). A view can also be displayed (e.g., a page allowing the user to configure various settings, such as web site settings).

Example 2

Exemplary Task Template

In any of the examples herein, a task template can be used to accomplish (e.g., complete) a task. For example, a task template can be used to direct a user to a user interface (e.g., a targeted user interface) of a managed application for accomplishing a task. For example, a task template can comprise a location variable or location field. The location variable or field can contain a location. The location can represent (e.g., be an address of) a user interface (e.g., a specific user interface such as a specific wizard, dialog, or view user interface). For example, the location can represent a user interface by way of an API of an application (e.g., a managed application). A task template can be in the format of a schema (e.g., an XML or XrML schema).

A task template can also be stored in a variety of ways and in a variety of locations. For example, task templates can be stored as data values in a tasks database (e.g., on a computer server). Task templates can also be stored as schemas (e.g., in a database, file, data store, or in another data storage location), such as an XML or XrML schema.

A task template can be updated. For example, a new task template can be downloaded to allow a user to accomplish the new task associated with the new task template. A task template can be downloaded in order to replace an existing task template (e.g., to provide updated functionality or to support a change to an application identified by a location variable of the task template). A task template can also be deleted or removed (e.g., from a tasks database on a computer server).

A task template can be used when a task is selected (e.g., invoked). For example, a task to add a new user to a network can be selected. In response, a location variable from a task template related to, or associated with, the task can be used to display a user interface identified by the location variable (e.g., to display a targeted user interface of a managed application).

One or more task templates can be related to, or associated with, a task. For example, a task such as "troubleshoot network" can be associated with multiple task templates (e.g., a task template for displaying a user interface containing a list of error events associated with the network, a task template for displaying a user interface for restarting a computer server, or a task template for displaying a user interface for configuring settings of a network service). If multiple task templates are associated with a task, then when the task is selected one of the task templates can be chosen based on various parameters (e.g., the type of task, status information, and task rules).

Selecting (e.g., invoking) or displaying a task template can comprise selecting or displaying an instance of the task template (e.g., displaying a user interface for accomplishing a task). An instance of a task template can be a specific occurrence of the task template. For example, a first instance of a task template can be displayed when a task template is selected (e.g., from a global task), and based on a location variable from the task template, a user interface of an application is displayed. A second instance of the same task template can also be displayed when the task template is selected (e.g., from a scoped task). In this way, multiple instances of the same task template can be selected and displayed.

The same task can be selected multiple times and multiple instances of the same task template displayed (e.g., at different times or at the same time). For example, an add user task can be selected multiple times and multiple instances of an add user task template can be displayed (e.g., multiple windows in a user interface, each window comprising fields for adding a user, such as: user name, real name, and password).

Or, different tasks can be selected and multiple instances of the same task template displayed. For example, an edit user task for a specific user can be selected and an instance of an edit user template can be displayed (e.g., filled in with the specific user's information). An edit user task for a different specific user can also be selected and an instance of the same edit user template can be displayed (e.g., filled in with the different specific user's information based on a passed context identifier identifying the specific user).

Example 3

Exemplary Object

In any of the examples herein, an object can be an entity, entity group, task, or another type of item associated with a computer network. For example, an object can be a computer (e.g., a desktop, laptop, or server), items residing on a computer (e.g., a database), a user, a printer, a network device (e.g., switch, hub, or router), a configuration setting, a license, a solution, or a group or collection of such items (e.g., a group of computer servers).

Tasks can be performed on an object. For example, a list of tasks associated with a selected object (e.g., scoped tasks) can be displayed. A task from the list of tasks can be selected and, using an associated task template, a user interface can be displayed for completing the task.

Example 4

Exemplary Entity

In any of the examples herein, an entity can be a single item associated with a computer network. For example, an entity can be a computer (e.g., a desktop, laptop, server), a user, a printer, a network device (e.g., switch, hub, router), a configuration setting, a license, or any other type of entity. Entities can be grouped together in entity groups.

Tasks can be performed on an entity. For example, an entity can be selected (e.g., by a user in a user interface). Selecting an entity (e.g., clicking or right-clicking on an icon representing the entity in a user interface) can display a list of tasks (e.g., a list of user interface elements for initiating the tasks). The list of tasks can be associated with the entity. A task from the list of tasks can be selected and, using an associated task template, a user interface can be displayed for completing the task.

Example 5

Exemplary Entity Group

In any of the examples herein, an entity group can comprise a collection of entities. The collection of entities can be homogeneous or heterogeneous. For example, a homogeneous users entity group can comprise a collection of user entities. A heterogeneous email entity group can comprise a collection of entities that participate in email activities, such as: users, email servers, client email applications, and server email applications.

The collection of entities can be related. For example, a network entity group can comprise a collection of entities related to the network (e.g., servers, user computers, printers).

Tasks can be performed on an entity group. For example, an entity group can be selected (e.g., by a user in a user interface). Selecting an entity group (e.g., clicking on an icon representing the entity group) can display a list of tasks (e.g., a list of user interface elements for initiating the tasks). The list of tasks can be associated with the entity group. A task from the list of tasks can be selected and, using an associated task template, a user interface can be displayed for completing the task. For example, selecting a network entity group can display a task for viewing bandwidth usage across the network (e.g., across the entities comprising the network entity group).

Example 6

Exemplary Scoped Task

In any of the examples herein, a task can be scoped. A scoped task can be a task that is associated with a selected object, entity, or entity group (e.g., the task applies to or will be performed on the selected object, entity, or entity group). For example, if a user is presented with a user interface displaying a number of entity groups, the user can select one of the entity groups. Once the user has selected one of the entity groups, a list of scoped tasks can be displayed (e.g., a list of user interface elements for initiating the scoped tasks). The list of tasks is scoped because it is associated with the selected entity group. For example, if the user selects a network entity group, the list of scoped tasks would be associated to the network entity group. An example of scoped tasks associated with a network entity group can be: view performance, view alerts, and view events.

Similarly, for example, if a user is presented with a user interface displaying a number of entities, the user can select one of the entities. Once the user has selected one of the entities, a list of scoped tasks can be displayed. The list of tasks is scoped because it is associated with the selected entity (e.g., the tasks apply to or will be performed on the selected entity). For example, if the user selects a specific computer server from a computer servers entity group, the list of scoped tasks would be associated with the specific computer server. An example of scoped tasks associated with a specific computer server entity can be: approve updates, configure web server, deploy new software package, view performance, view alerts, and view events. For example, the approve updates scoped task can allow a user to approve updates for the selected computer server entity.

Example 7

Exemplary Global Task

In any of the examples herein, a task can be a global task. A global task can be a task that is displayed (e.g., as a user interface element for initiating the global task) regardless of whether an object, entity, or entity group is selected (e.g., a global task is not tied to the display of an object, entity, or entity group). Therefore, global tasks can be displayed independently of scoped tasks.

For example, a user can be presented with a user interface in which there are no objects, entities, or entity groups selected. A list of global tasks can be displayed in the user interface. For example, the list of global tasks can include: configure firewall settings, approve updates on server 1, review email license usage, and view file server performance.

Global tasks can also be displayed at the same time (e.g., simultaneously, concurrently, contemporaneously) as scoped tasks. For example, a list of global tasks can be displayed in a user interface (where there are no objects, entities, or entity groups selected). A user can then select an object, entity, or entity group which causes display (e.g., in a separate area of the user interface) of a list of scoped tasks. The list of global tasks can have a label identifying the list, as can the list of scoped tasks. The global tasks and scoped tasks can also be mixed (e.g., in a single list of tasks).

Displaying a list of scoped tasks can cause a list of global tasks to be removed (e.g., from being displayed in a user interface). For example, if a user selects an object, entity, or entity group, then a currently displayed list of global tasks can be removed and a list of scoped tasks displayed instead (e.g., replaced by the list of scoped tasks in the same area of the user interface, or in a different area of the user interface).

Example 8

Exemplary Pivot

In any of the examples herein, a pivot can be the ability to switch between different options, procedures, or techniques of accessing, displaying, navigating to, or viewing entity groups, entities, objects, or tasks (e.g., a task template, or instance of a task template, associated with the task). For example, a user can be presented with two options for accessing a task template, and the user can pivot (e.g., switch, alternate, change) between the two options. One of the two options can represent task navigation via a global task list, and the other option can represent task navigation via a scoped task list.

Example 9

Exemplary Management Application

In any of the examples herein, a management application can be an application (e.g., a server application) that is used to manage the operations of a multi-server computer system (e.g., a computer system providing services to a business or organization). A management application can run on a management computer server. A management application can display one or more user interfaces. A user of the management application can manage the operations of the multi-server computer system via the user interfaces of the management application (e.g., by selecting tasks displayed in the user interfaces). The tasks can be used to manage computer servers and applications (e.g., managed applications) of the multi-server computer system.

Example 10

Exemplary Managed Application

In any of the examples herein, a managed application can be an application (e.g., a server application) that is managed by a management application (e.g., running on a management computer server). For example, a managed application can be one of a collection of managed applications designed to operate a multi-server computer system (e.g., providing services to a business or organization).

Example 11

Exemplary Targeted User Interface

In any of the examples herein, a targeted user interface can be a specific user interface of a managed application. For example, a targeted user interface of a managed application can be identified for display on a local display (e.g., a display of a computer server on which the managed application is running) or on a remote display (e.g., a display of a remote computer server such as a management computer server).

A managed application can comprise any number of targeted user interfaces. For example, a managed application can have a targeted user interface for displaying information (e.g., a view), a targeted user interface for receiving an answer from a user (e.g., a dialog), and a targeted user interface for directing a user through a series of steps (e.g., a wizard).

Figure 9:
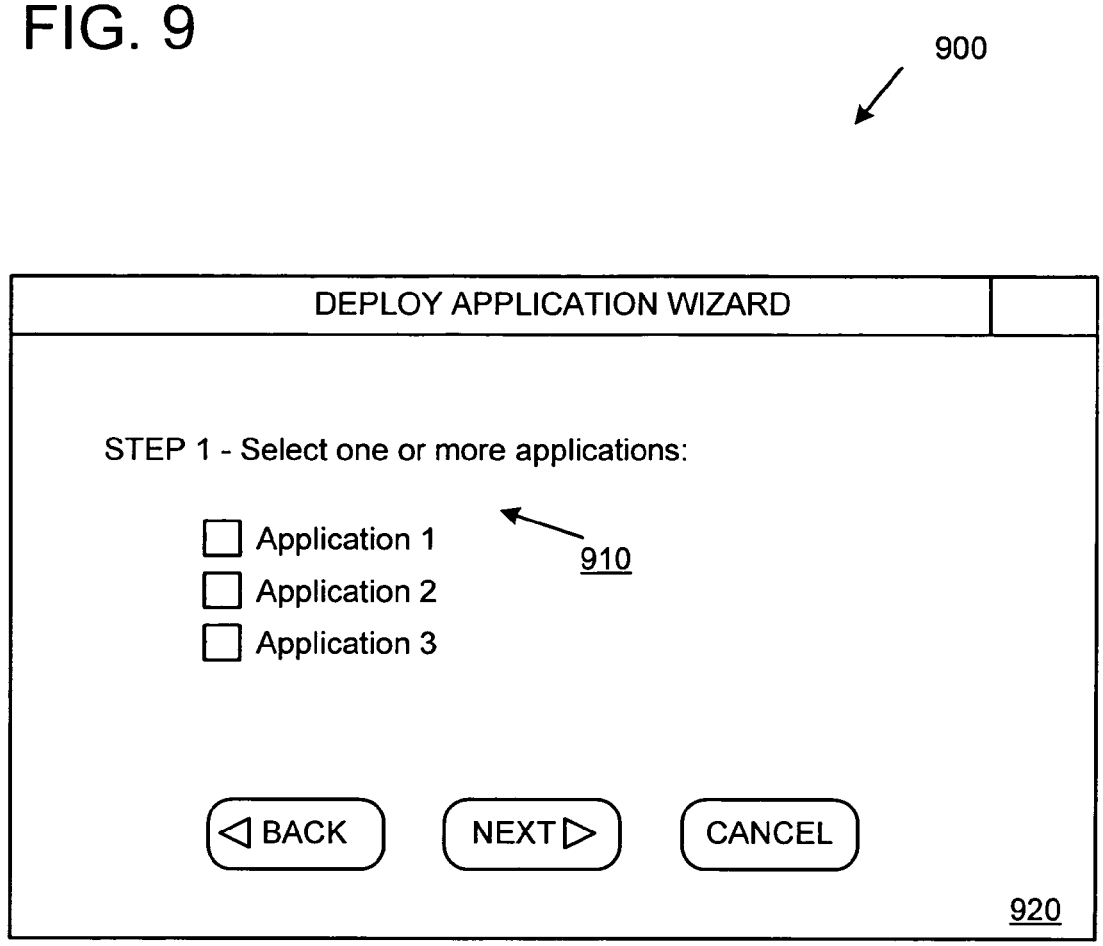
FIG. 9 is a diagram showing an exemplary wizard targeted user interface.

Targeted user interfaces can be of a variety of types. One type of targeted user interface is a wizard. A wizard targeted user interface can be used to direct a user through a sequence of steps in a set order (e.g., using "BACK" and "NEXT" buttons to step through the wizard). For example, a wizard targeted user interface can direct a user through the steps of deploying new software applications on client computers. An example of such a wizard targeted user interface is depicted in FIG. 9.

Figure 10:
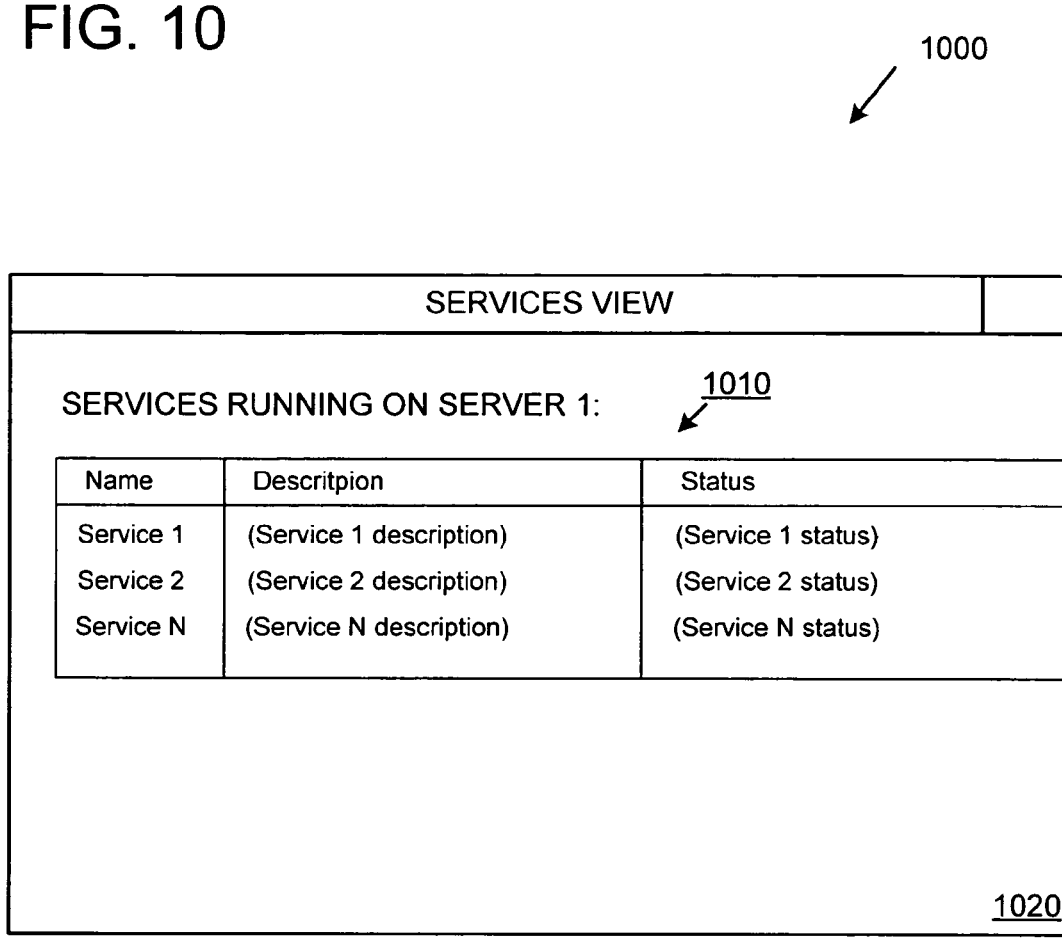
FIG. 10 is a diagram showing an exemplary view targeted user interface.

Another type of targeted user interface is a view. A view targeted user interface can present information in a variety of formats (e.g., a list view or a topology view). For example, a view targeted user interface can present a list of software updates waiting to be approved (e.g., software updates associated with a selected computer server). A view targeted user interface can be fixed (e.g., a static view of information) or dynamic (e.g., the result of a query on a database). A view targeted user interface can be action based (e.g., it can display information related to a specific action, such as an error or an alert). A view targeted user interface can be object based (e.g., it can display information scoped to a specific object, such as a selected entity or entity group). A view targeted user interface can also present a list of services running on a selected server. An example of such a view targeted user interface is depicted in FIG. 10.

Figure 11:
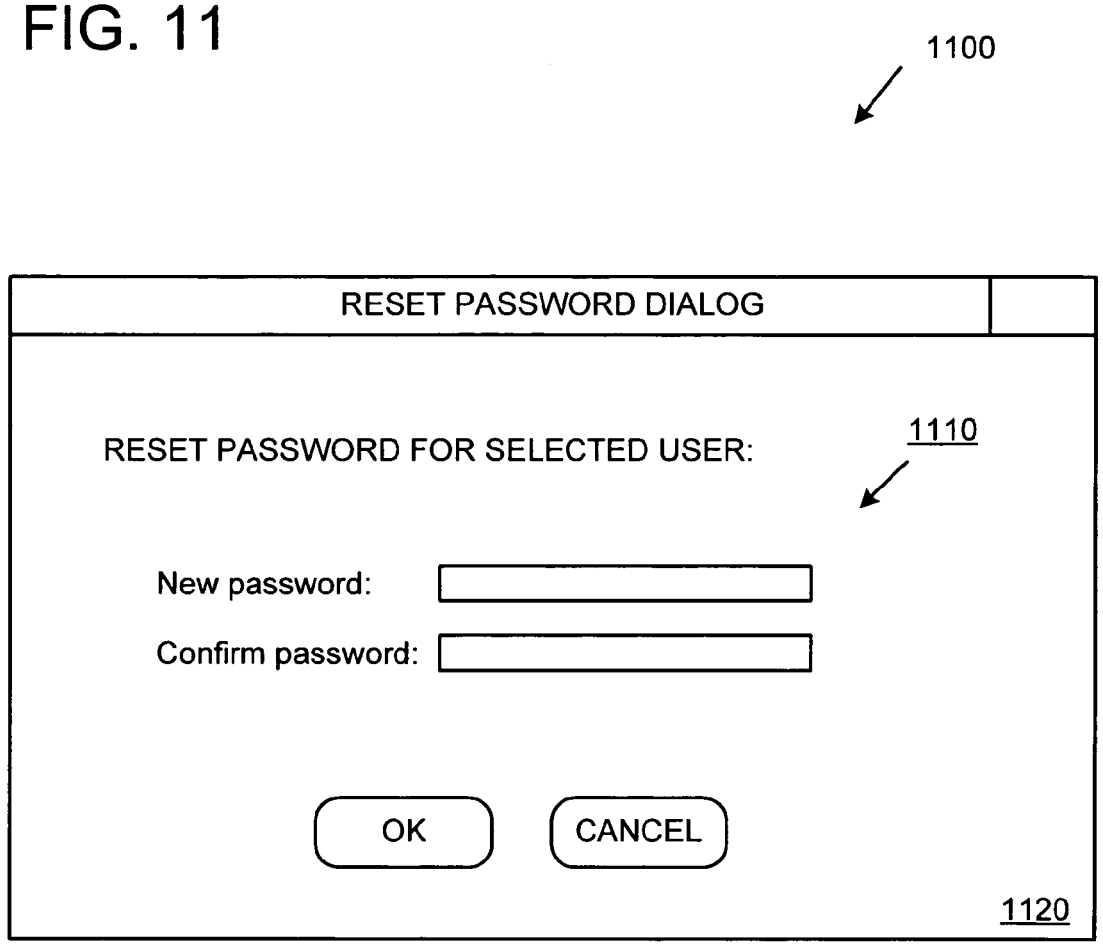
FIG. 11 is a diagram showing an exemplary dialog targeted user interface.

Another type of targeted user interface is a dialog. A dialog targeted user interface can present information to a user and receive the user's response. For example, a dialog targeted user interface can request confirmation for deleting a user account (e.g., including "YES" and "NO" buttons). A dialog targeted user interface can present an error message along with an "OK" button to close the dialog. A dialog targeted user interface can also accept user input. For example, a dialog for resetting a user's password can accept a new password and a confirmation password, along with "OK" and "CANCEL" buttons. An example of such a dialog targeted user interface is depicted in FIG. 11.

Different types of targeted user interfaces can be displayed in addition to those described above. Furthermore, different types of targeted user interfaces can be combined in a single targeted user interface (e.g., in a single window).

A targeted user interface of a managed application can be identified for display in a number of ways. A targeted user interface of a managed application can be identified by a task template. For example, a location variable or field of the task template (e.g., a task template in a format defined by a schema such as XML or XrML) can identify the targeted user interface of the managed application (e.g., by way of an interface identifier).

A targeted user interface can be personalized based on personalization information. For example, a management application can collect personalization information (e.g., user names, logon names, passwords, user credentials, authorization information, and various preferences). The personalization information can be passed to the managed application (e.g., during the fall-through experience) and used to display the personalized targeted user interface (e.g., display the targeted user interface based on the personalization information). The personalization information can also be passed to the managed application in order to grant access to the targeted interface (e.g., the personalization information can be a user credential).

Example 12

Exemplary Display of a Targeted User Interface

In any of the examples herein, a targeted user interface can be displayed in a variety of ways. A targeted user interface of a managed application can be displayed on a display of a computer server running the managed application (e.g., a local display), or on a display of a different computer server (e.g., a remote display). For example, a targeted user interface of a managed application can be displayed at a management computer server (e.g., in a display of the management computer server) from a different computer server running the managed application (e.g., the targeted user interface can be displayed remotely over a network connecting the management computer server and the different computer server).

A targeted user interface can be displayed in a window in a display. For example, a user interface of a management application can be displayed in a window at a management computer server (e.g., in a display of the management computer server), and a targeted user interface of a managed application can be displayed in a different window at the management computer server (e.g., in the same display of the management computer server).

A single window can be used for targeted user interfaces displayed (e.g., in a display of a management computer server). For example, a targeted user interface can be displayed in the window, and when a new or different targeted user interface is displayed, it can be displayed in the same window (e.g., replacing the display of the original targeted user interface). Using a single window can simplify the display process such that a user is not confused by simultaneous display of multiple targeted user interface windows.

A set number of windows can also be used for targeted user interfaces (e.g., pre-defined or based on a user preference). For example, if the set number of windows is four, then four simultaneous targeted user interfaces can be displayed in four different windows (e.g., all displayed in a display of a management computer server). If a new or different targeted user interface is displayed, it can be displayed in one of the existing four windows (replacing the targeted user interface displayed in the window previously).

Display of a new targeted user interface in a window can cause all other windows of a display to be minimized (e.g., displayed only as small icons representing the minimized windows such that the majority of the display is free for display of the new targeted user interface window).

Settings controlling various window options (e.g., using a single window, a set number of windows, or minimizing windows) can be pre-configured or user-configurable (e.g., via a settings or preferences user interface of a management application).

Example 13

Exemplary Fall-Through

In any of the examples herein, fall-through can be the act of displaying a targeted user interface of a managed application at a management computer server by way of a management application. For example, a user of a management application running on a management computer server can select a task, and based on a task template associated with the selected task, a targeted user interface of a managed application can be displayed at the management computer server.

Falling-through to a targeted user interface of a managed application based on a selected task can save a user the trouble of, for example, going to a server running the managed application, logging in, and navigating various user interfaces of the managed application in order to find the desired user interface (e.g., the targeted user interface).

In addition, the fall-through experience can also automate some security checks (e.g., by passing personalization information). For example, the management computer server can require a certain level of user access credentials. These credentials can then be automatically passed on to the fall-through targeted user interface of the managed application and used to either personalize the experience or to automate completion of some security or other login dialogs. The ability for the fall-through experience to automate dialogs is determined by the managed application. For example, if a managed application wishes to prevent automated data entry for security reasons, the user will have to view and manually re-enter that information during the fall-through experience.

Example 14

Exemplary User Interface Identifier

In any of the examples herein, a task template can comprise a user interface identifier (e.g., a unique user interface identifier) for identifying a targeted user interface of a managed application (e.g., identifies the specific targeted user interface from a plurality of targeted user interfaces of the managed application). For example, the user interface identifier can be stored in a location variable or field of a task template (e.g., where the task template is in a format defined by a schema). A user interface identifier can be obtained from a task template and passed to a managed application (e.g., via an API of the managed application such as a command line interface) to cause display of the targeted user interface of the managed application identified by the user interface identifier.

A user interface identifier can be passed from a management application to a managed application running on the same computer server (e.g., a management computer server). A user interface identifier can also be passed from a management application running on a management computer server to a managed application running on a different computer server (e.g., passed over a network connecting the management computer server and the computer server running the managed application).

Example 15

Exemplary Context Identifier

In any of the examples herein, a context identifier can identify a context of a task, object, entity, or entity group (e.g., a context associated with a task, object, entity, or entity group). A context identifier can be used to display a targeted user interface with a context identified by the context identifier.

For example, the context associated with the task "view events for server 1" can be "server 1." The context identifier for the context "server 1" can be a unique server identifier identifying server 1. The context of an object, entity, or entity group can be the object, entity, or entity group itself. For example, the context of the entity "user 1" can be "user 1." The context identifier for the context "user 1" can be a unique user identifier identifying user 1.

A context identifier can be passed to a managed application (e.g., via an API of the managed application such as a command line interface). A context identifier can be passed to a managed application in addition to, or instead of, passing a user interface identifier to the managed application.

A context identifier can be passed to a managed application and used to display a targeted user interface of the managed application with a context identified by the context identifier. For example, if the targeted user interface is a user interface for displaying a list of events generated by a computer, then a context identifier identifying a specific computer can be passed. For example, if a user selects a task, such as "display events for server 1," in a management application, then a context identifier identifying "server 1" can be passed to the targeted user interface causing display of a list of events generated by the specific computer "server 1."

Example 16

Exemplary Status Information

In any of the examples herein, status information can be associated with an object, entity, or entity group. Some examples of status information can be: patch compliance, health, security, licensing, bandwidth, and performance. For example, an object or entity such as a specific computer server can be associated with status information indicating that the computer server has a number of software patches awaiting approval, that the a service running on the computer server has stopped responding, and that available bandwidth on a network connection of the computer server has dropped below a user-configurable threshold.

Status information can be used to choose a task template from a plurality of task templates. For example, a task can be associated with a plurality of task templates. If the task is selected, then one task template from the plurality can be chosen based on status information. For example, a selected task "troubleshoot server 1" can be associated with: a task template identifying a targeted user interface for displaying a dialog describing a current error condition, a task template identifying a targeted user interface for displaying a wizard to restart the server, and a task template identifying a targeted user interface for displaying a list of events or settings for the server. If the status information associated with "server 1" indicates that server 1 experienced an error condition, then the task template identifying the targeted user interface for describing the current error condition can be chosen.

Status information can be analyzed. Status information can be analyzed using best practices or heuristics. For example, best practices can indicate a preference for choosing task templates related to displaying error conditions or alerts over task templates related to displaying licensing information.

Example 17

Exemplary Choosing a Task Template

In any of the examples herein, a task template can be chosen. For example, a task template can be chosen from multiple task templates associated with a task. A task template can be chosen in a number of ways. A task template can be chosen based on status information (e.g., based on analysis of status information). A task template can also be chosen based on task rules.

Example 18

Exemplary Task Rules

In any of the examples herein, task rules can be used to choose task templates. A task rule can choose a task template based on various input, such as the object or objects (or entities or entity groups) triggering the task and their associated status information.

Example 19

Exemplary System for Displaying a User Interface of a Managed Application

FIG. 1 shows an exemplary system 100 for displaying a user interface of a managed application. In the example, a management application 110 can run on a management computer server. For example, the management application can be used to manage software (e.g., applications, server applications, and operating systems) of an integrated multi-server system or environment (e.g., an integrated multi-server system of a business or organization).

The management application 110 can be used to manage the managed application 120. For example, various tasks for managing the managed application 120 can be displayed in a user interface of the management application 110. Selecting tasks displayed in the user interface of the management application 110 can cause display of various user interfaces (e.g., targeted user interfaces) of the managed application 120. The various user interfaces of the managed application 120 can be displayed at a management computer server running the management application 110. The managed application 120 can run on the same server as the management application 110 or on a different server.

Example 20

Exemplary System for Managing Managed Applications

Figure 2:
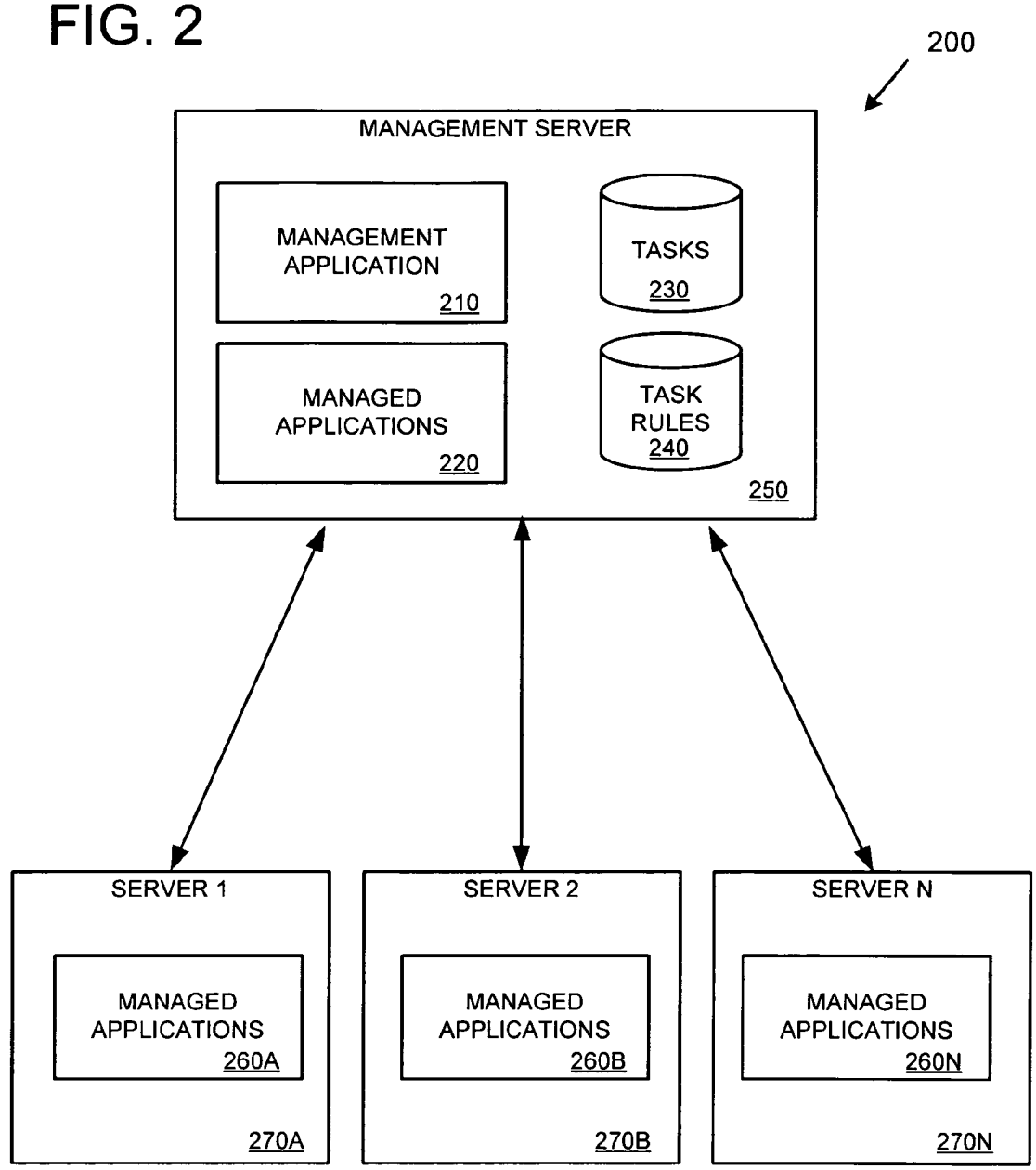
FIG. 2 is a diagram showing an exemplary system for managing managed applications.

FIG. 2 shows an exemplary system 200 for managing managed applications from a management application running on a management computer server. In the example, a management application 210 is running on a management computer server 250. The management application 210 can be used to manage applications (managed applications) running on different computer servers, such as managed applications 260A-N running on computer servers 270A-N. The management application 210 can also be used to manage applications (managed applications) 220 running on the management computer server 250. Non-managed applications can also run on the management computer server 250, as well as the other computer servers 270A-N.

The management application 210 can be used to manage the managed applications 220 and 260A-N using tasks. The management application 210 can display tasks in a user interface of the management application 210. The tasks can be displayed, in the user interface of the management application 210, as user interface elements representing the tasks.

Tasks can be performed by task templates. Task templates can be stored in a tasks database 230 located on the management computer server 250. The task templates in the tasks database 230 can be stored in a format defined by a schema. The task templates can comprise a location variable or field. The location variable or field can identify a targeted user interface of a managed application (e.g., a targeted user interface of managed applications 220, 260A, 260B, or 260N).

For example, a user of the management application 210 can select a displayed task (e.g., by selecting a user interface element representing the task). A task template associated with the task selected by the user (e.g., a task template from the tasks database 230) can be selected (e.g., chosen). Based on the selected task template, a targeted user interface of a managed application (e.g., 220 or 260A-N) can be displayed. The targeted user interface can be displayed at the management computer server 250 from a managed application 260A-N running on one of the other computer servers 270A-N, or from a managed application 220 running on the same computer server 250.

If more than one task template is associated with (e.g., related to) a selected task, one of the task templates can be chosen. For example, one of the task templates can be chosen based on status information of one or more objects selected in a user interface of the management application 210. One of the task templates can also be chosen based on task rules 240 (e.g., task rules 240 stored in a task rules database, or other data storage format, on the management server 250).

Example 21

Exemplary Method for Displaying a Targeted User Interface

Figure 3:
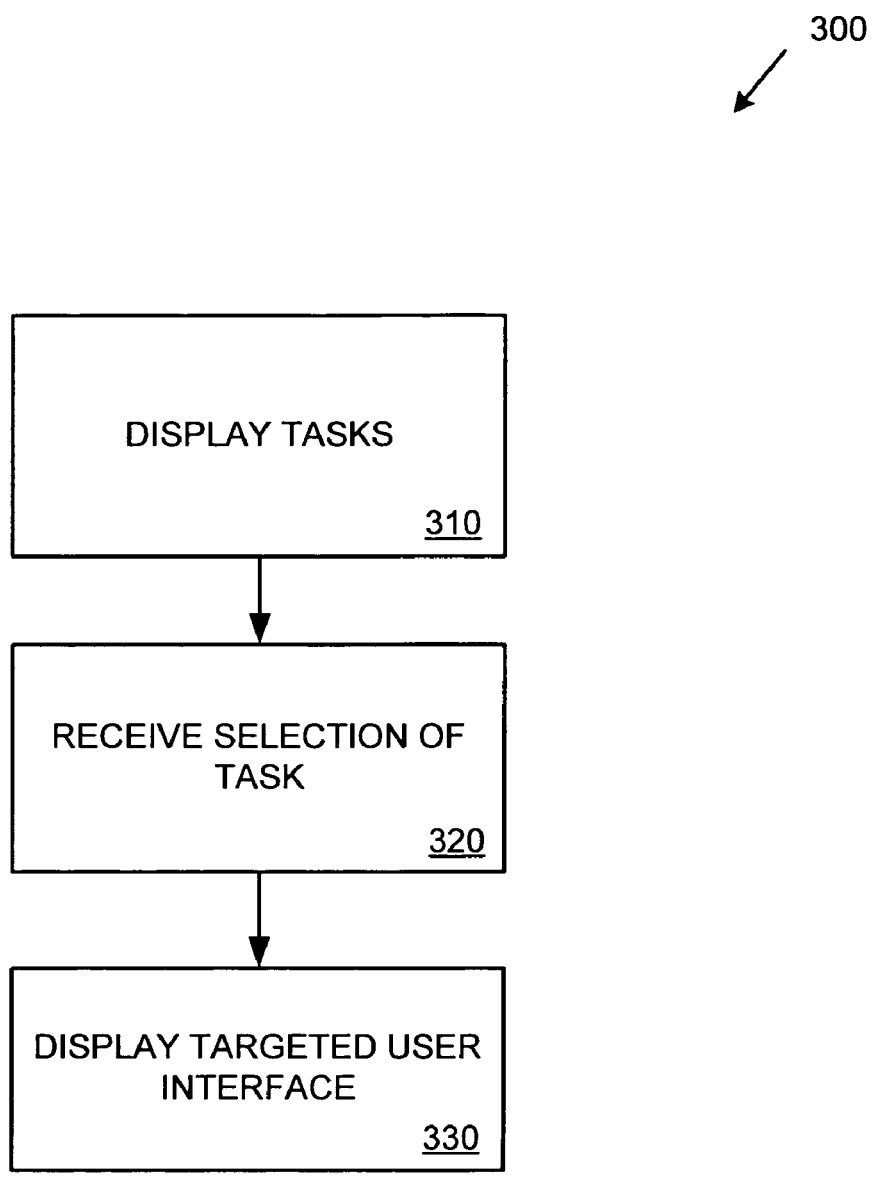
FIG. 3 is a flowchart showing an exemplary method for displaying a targeted user interface.

FIG. 3 shows an exemplary method 300 for displaying a targeted user interface of a managed application, and can be performed, for example, by a system such as that shown in FIG. 2. At 310, one or more tasks are displayed in a user interface of a management application running on a management computer server. For example, the tasks displayed in the user interface of the management application can be global tasks. The tasks can also be displayed based on the selection of an object (e.g., scoped tasks). For example, one or more objects (e.g., entity groups and entities) can be displayed in the user interface of the management application. One of the objects can be selected by a user of the user interface, and the one or more tasks associated with the selected object can be displayed. For example, the selected object can be a network entity group, and when a user selects the network entity group a number of tasks associated with the network entity group can be displayed (e.g., tasks such as: troubleshoot network, display performance, and configure web server settings).

At 320, a selection of a task from the one or more displayed tasks is received via the user interface. For example, a user can select a user interface element associated with the task in order to select the task.

At 330, based on a task template associated with the selected task, the targeted user interface of the managed application is displayed at the management computer server. The managed application can be located at the management computer server or at a different server. Either way, the targeted user interface can be displayed at the management computer server (e.g., in a display of the management computer server). For example, a user can be using the management application on the management computer server, select a task, and view the targeted user interface of the managed application at the management computer server (e.g., without having to go to a different server running the managed application, log in, and run the managed application to display the targeted user interface).

The task template associated with the selected task can identify the targeted user interface of the managed application. For example, the task template can comprise a user interface identifier (e.g., a unique user interface identifier) that identifies the targeted user interface (e.g., identifies the specific targeted user interface from a plurality of targeted user interfaces of the managed application).

Displaying the targeted user interface 330 can comprise passing the user interface identifier that is obtained from the task template associated with the selected task to the managed application. The user interface identifier can be passed to the managed application via an API of the managed application (e.g., a command line interface). If the managed application is running on a computer server other than the management computer server, then the user interface identifier can be passed over a network connecting the management computer server and the computer server running the managed application.

Displaying the targeted user interface 330 can also comprise passing a context identifier associated with the selected task to the managed application. The context identifier can be passed in addition to, or instead of, passing the user interface identifier. For example, the context identifier can identify a context of the selected task. For example, if the task is "approve updates for server 1," then the context identifier can be a unique computer identifier identifying "server 1." The context identifier can be used by the managed application to display the targeted user interface with the context "server 1" (e.g., display a list of updates that need to be approved for server 1).

Example 22

Figure 4:
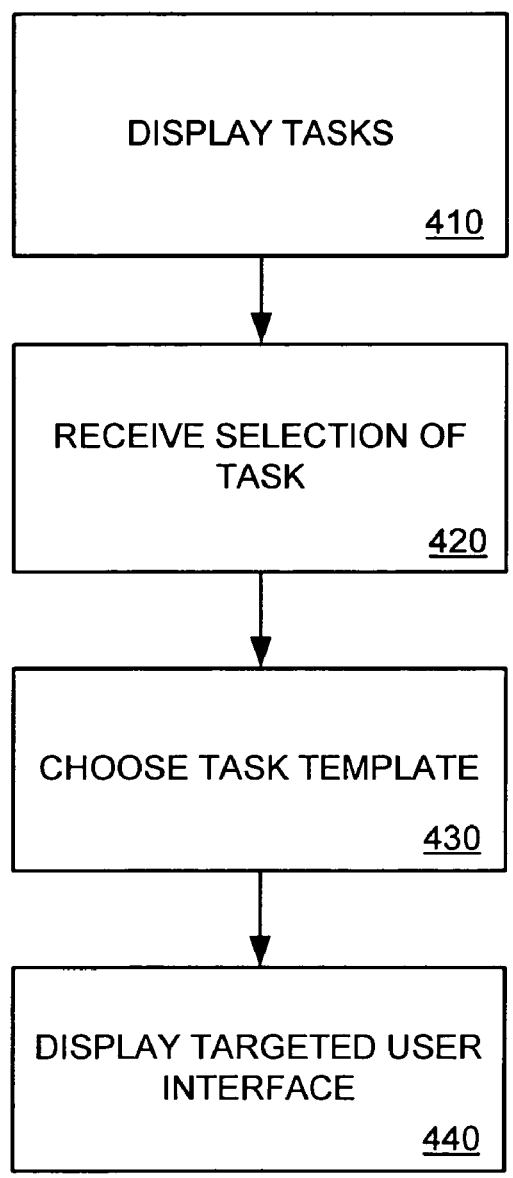
FIG. 4 is a flowchart showing an exemplary method for displaying a targeted user interface at a management computer server.

Exemplary Method for Displaying a Targeted User Interface at a Management Computer Server FIG. 4 shows an exemplary method 400 for displaying a targeted user interface of a managed application at a management computer server, and can be performed, for example, by a system such as that shown in FIG. 2. At 410, one or more tasks are displayed in a user interface of the management application running on the management computer server. For example, the one or more tasks can be displayed based on the selection of an object (e.g., an entity or entity group) from the user interface.

At 420, a selection of a task from the one or more displayed tasks is received via the user interface. For example, a user can select a user interface element associated with the task in order to select the task. At 430, a task template associated with the selected task is chosen. At 440, based on the chosen task template, the targeted user interface of the managed application is displayed at the management computer server (e.g., in a display of the management computer server).

Example 23

Exemplary Method for Choosing a Task Template

Figure 5:
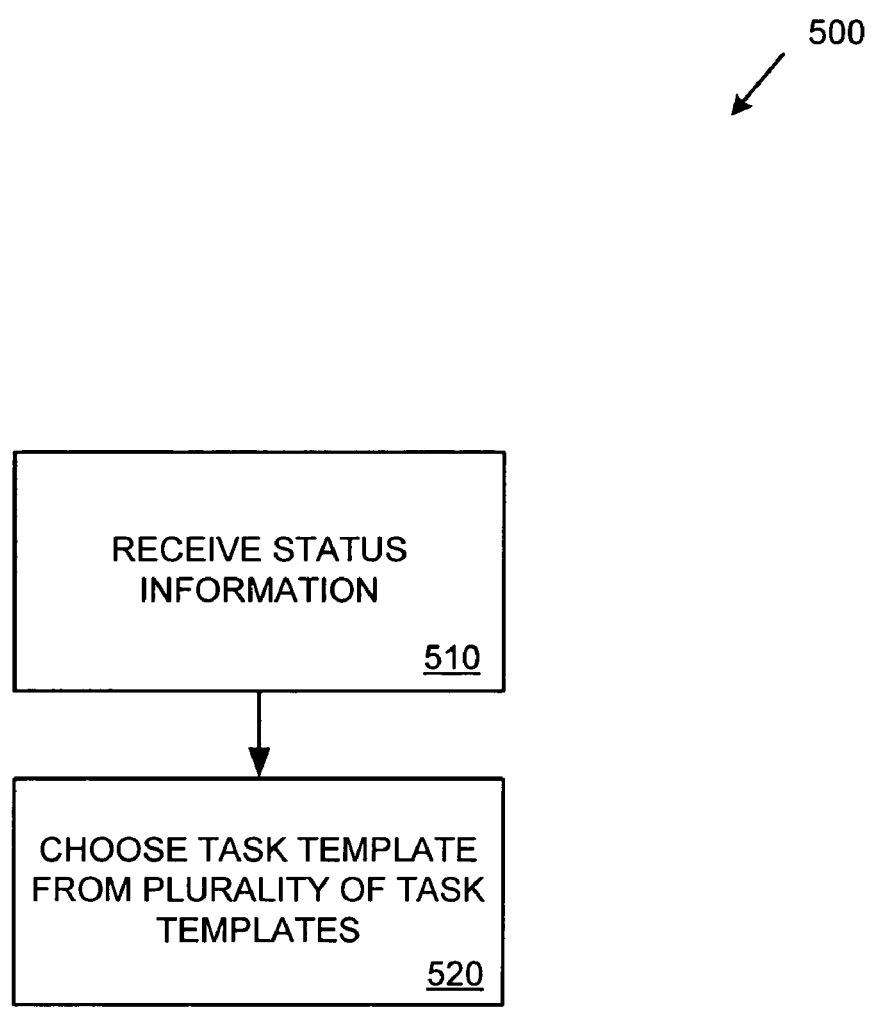
FIG. 5 is a flowchart showing an exemplary method for choosing a task template.

FIG. 5 shows an exemplary method 500 for choosing a task template from a plurality of task templates associated with a selected task, and can be performed, for example, by a system such as that shown in FIG. 2. At 510, status information is received (e.g., status information of one or more objects associated with a selected task). At 520, the task template is chosen from the plurality of task templates based on the status information.

Example 24

Exemplary Method for Choosing a Task Template based on Task Rules

Figure 6:
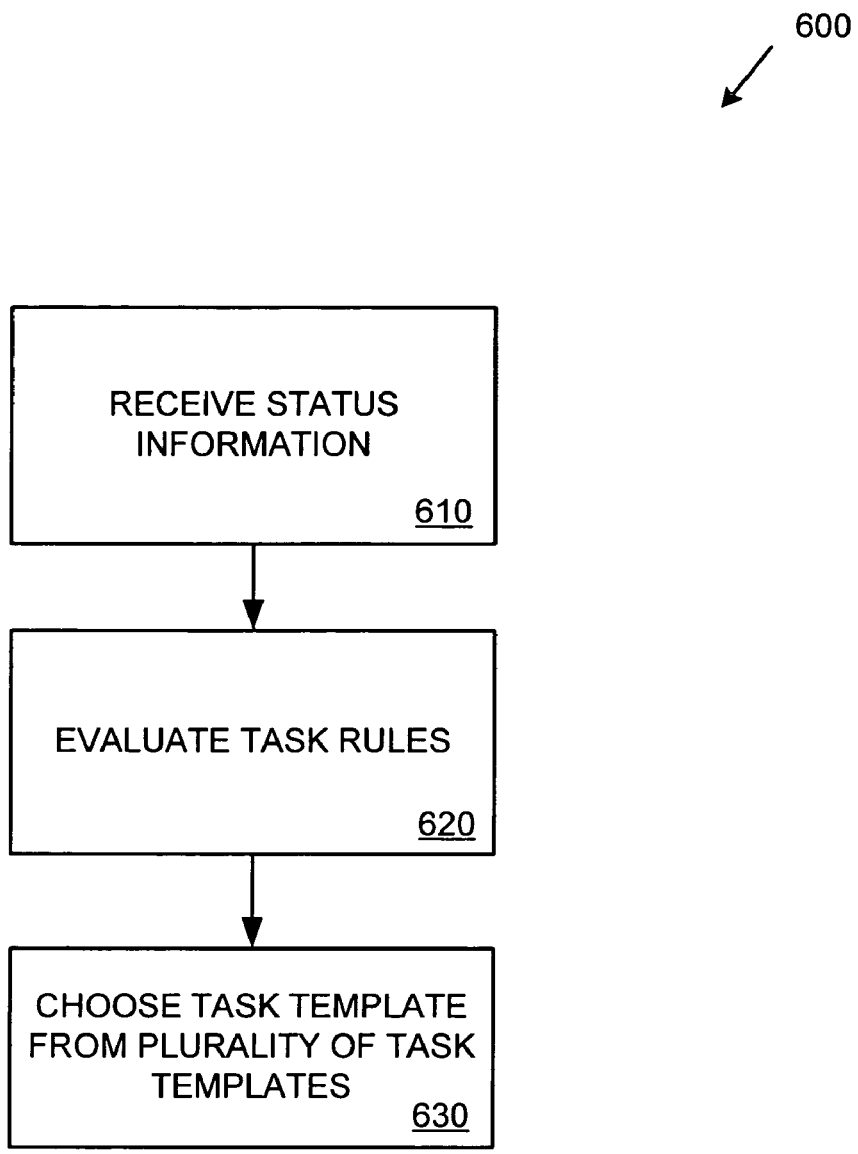
FIG. 6 is a flowchart showing an exemplary method for choosing a task template based on task rules.

FIG. 6 shows an exemplary method 600 for choosing a task template from a plurality of task templates associated with a selected task based on task rules, and can be performed, for example, by a system such as that shown in FIG. 2. At 610, status information of one or more objects associated with a selected task is received. At 620, one or more task rules are evaluated based on the status information. At 630, the task template is chosen from the plurality of task templates based on the evaluation.

Example 25

Exemplary Method for Managing a Managed Application

Figure 7:
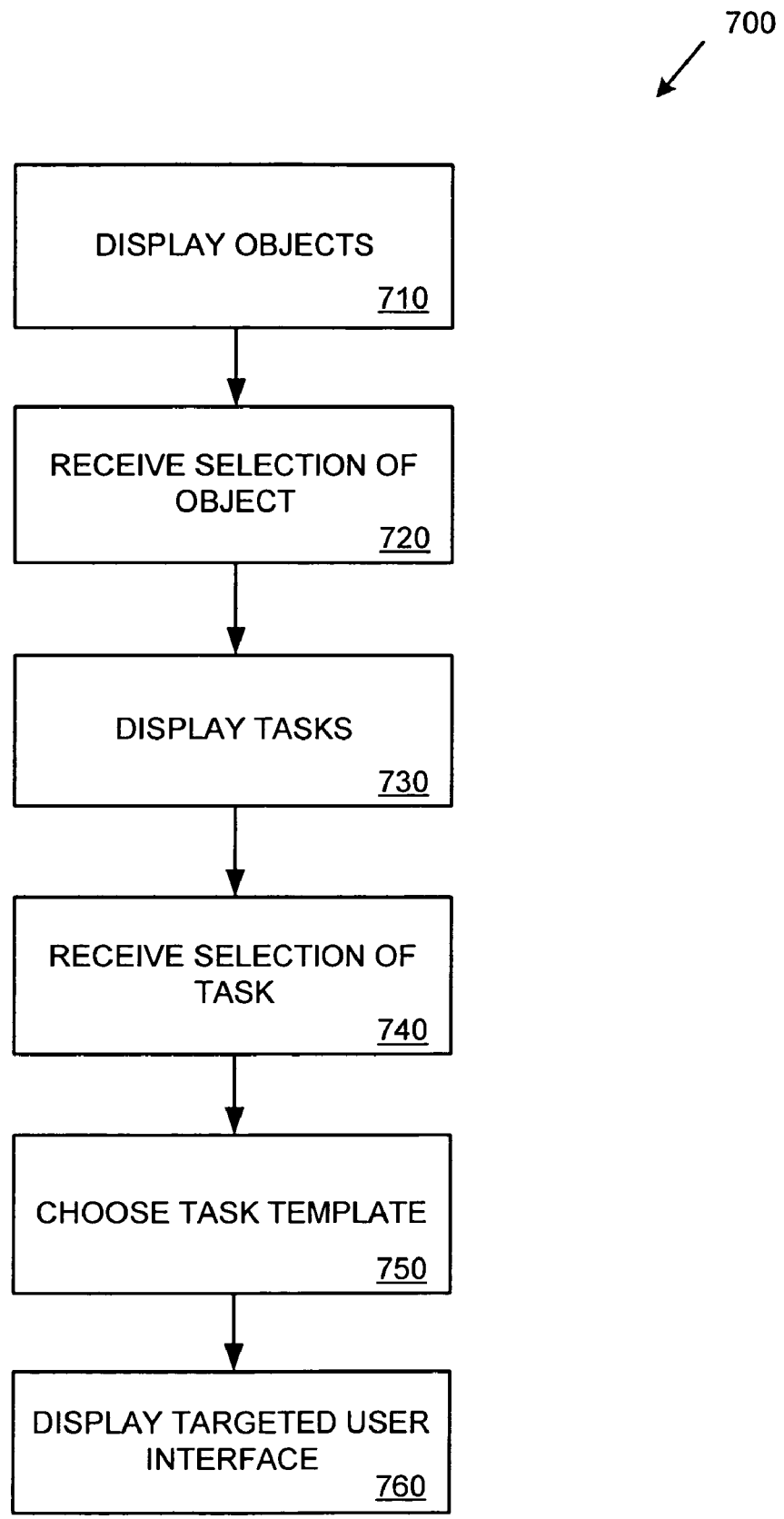
FIG. 7 is a flowchart showing an exemplary method for managing a managed application.

FIG. 7 shows an exemplary method 700 for managing a managed application from a management computer server, and can be performed, for example, by a system such as that shown in FIG. 2. At 710, objects are displayed in a user interface of a management application running on the management computer server. For example, the objects can be one or more entity groups (e.g., users, network, and licensing) or one or more entities (e.g., a number of computer server entities or a number of user entities).

At 720, a selection of an object from the displayed objects is received. For example, the displayed objects can be represented, in the user interface, by user interface elements. A user can select an object by selecting the user interface element associated with the desired object.

At 730, tasks associated with the selected object are displayed. For example, if the selected object is the network entity group, then the tasks can be tasks associated with the network entity group, such as: troubleshoot network, view performance, and configure web server.

At 740, a selection of a task from the displayed tasks is received. For example, the tasks can be represented in the user interface by user interface elements such as links or buttons. A user can select a task by selecting the user interface element associated with the task.

At 750, a task template is chosen. The task template can be chosen from a number of task templates associated with the selected task. For example, the task template can be chosen based on status information associated with the selected object. Task rules can also be evaluated based on the status information At 760, the targeted user interface of the managed application is displayed at the management computer server based on the chosen task template. The targeted user interface can be identified by a user interface identifier obtained from the task template (e.g., where the user interface identifier is stored in a location variable or field of the task template). The targeted user interface can be displayed with a context associated with the selected object by passing a context identifier to the managed application.

Example 26

Exemplary User Interface of a Management Application

Figure 8:
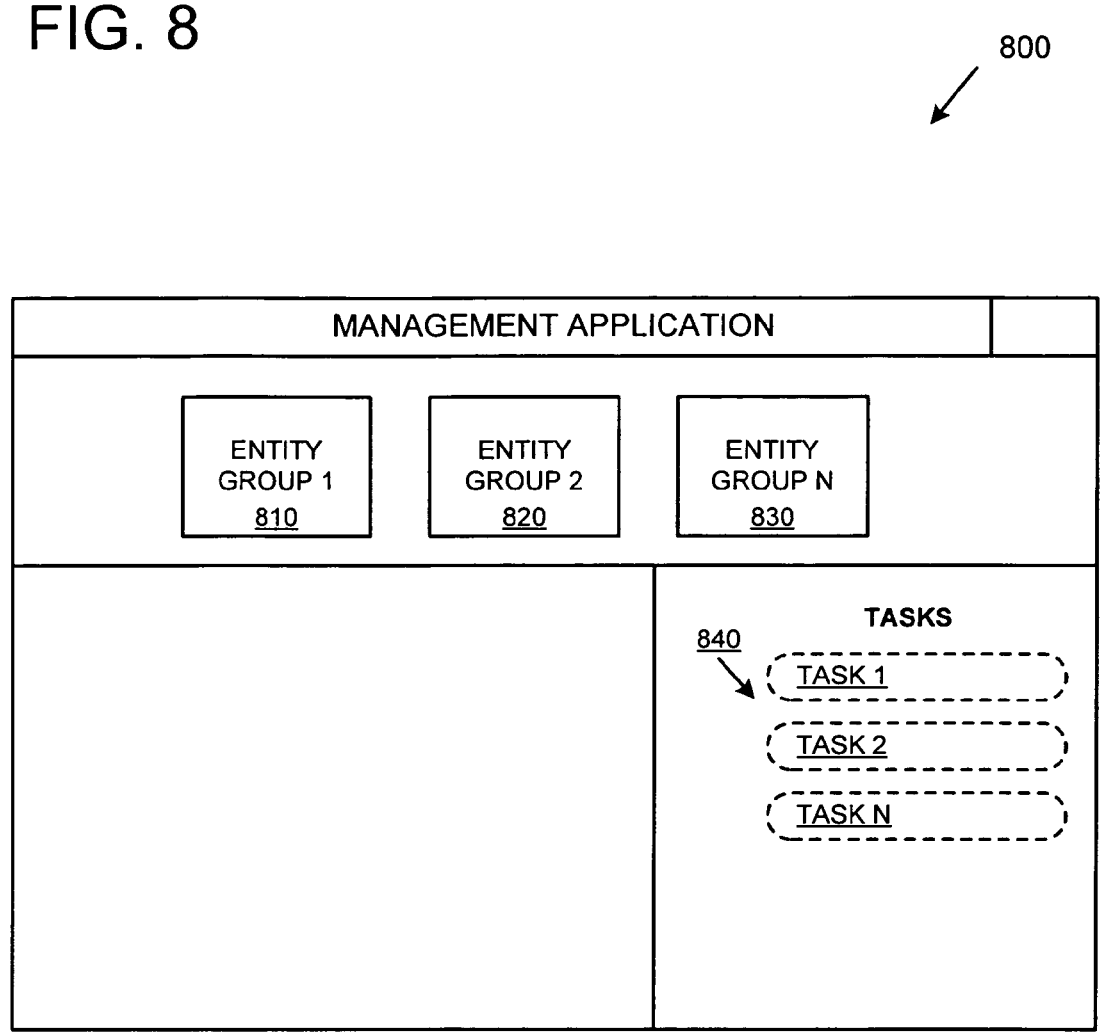
FIG. 8 is a diagram showing an exemplary user interface of a management application.

FIG. 8 shows an exemplary user interface 800 of a management application. The user interface can be displayed, for example, by a system such as that shown in FIG. 2. In the user interface 800, a variable (e.g., arbitrary) number of entity groups can be displayed (e.g., 810, 820, and 830). For example, one of the entity groups (e.g., 810) can be a network entity group. Another of the entity groups (e.g., 820) can be a users entity group. And, another of the entity groups (e.g., 830) can be a licensing entity group.

Also displayed in the user interface 800 is a list of tasks 840. The list of tasks 840 can be displayed when none of the objects (e.g., entity groups 810-830) have been selected in the user interface 800. Or, the list of tasks 840 can be displayed based on a selection of one of the objects displayed in the user interface (e.g., when "entity group 1" 840 is selected).

The user interface 800 of the management application can be displayed at a management computer server (e.g., where the management application is running on the management computer server).

Example 27

Exemplary Wizard Targeted User Interface

FIG. 9 shows an exemplary wizard targeted user interface 900 for deploying software applications. In the targeted user interface 920, a user can select one or more applications to be deployed 910 (e.g., deployed to computer servers or client computers). Various buttons or links can be displayed in the user interface 920. The user can be directed through a series of steps by the wizard. For example, after selecting the applications 910, the user can click the "NEXT" button to proceed to a different page of the wizard (e.g., a page for selecting computers on which to deploy the selected applications). The wizard targeted user interface 900 can be displayed at a management computer server (e.g., on a display of the management computer server) from a managed application running on a different computer server.

Example 28

Exemplary View Targeted User Interface

FIG. 10 shows an exemplary view targeted user interface 1000 for displaying a list of services running on a computer server. In the targeted user interface 1020, a user can view a list of services running on a specific computer server 1010. Other types of information can also be displayed in the view targeted user interface 1020, such as a list of events associated with a specific computer, a topology view of multiple network devices, or a list of software updates awaiting approval. The view targeted user interface 1000 can be displayed at a management computer server (e.g., on a display of the management computer server) from a managed application running on a different computer server.

For example, a user can select, in a user interface of a management application running on a management computer server, a network entity group. In response to the selection, a number of computer servers can be displayed in the user interface. The user can select one of the computer servers, which can result in display of a number of tasks associated with the selected computer server (e.g., view events, view services, approve updates). If the user selects the view services task, a user interface identifier can be obtained from a task template associated with the view services task. The user interface identifier along with a context identifier identifying the context of the selected computer server can be passed to a managed application. The managed application can then display the targeted user interface 1000 identified by the user interface identifier (the view services targeted user interface) with the context identified by the context identifier (the selected computer server). The targeted user interface 1000 would then display the services running on the selected computer server. The targeted user interface 1000 can be displayed at the management computer server from the managed application running on the same computer server or a different computer server.

Example 29

Exemplary Dialog Targeted User Interface

FIG. 11 shows an exemplary dialog targeted user interface 1100 for resetting a password. In the targeted user interface 1120, a user can reset a password for a selected user by entering a new password and a confirmation of the new password 1110. Once the user has entered the new password information, the user can click the "OK" button in the user interface 1120 to complete the task of resetting the user's password. The dialog targeted user interface 1100 can be displayed at a management computer server (e.g., on a display of the management computer server) from a managed application running on a different computer server.

Example 30

Exemplary User Interface Depicting a Problem

Figure 12:
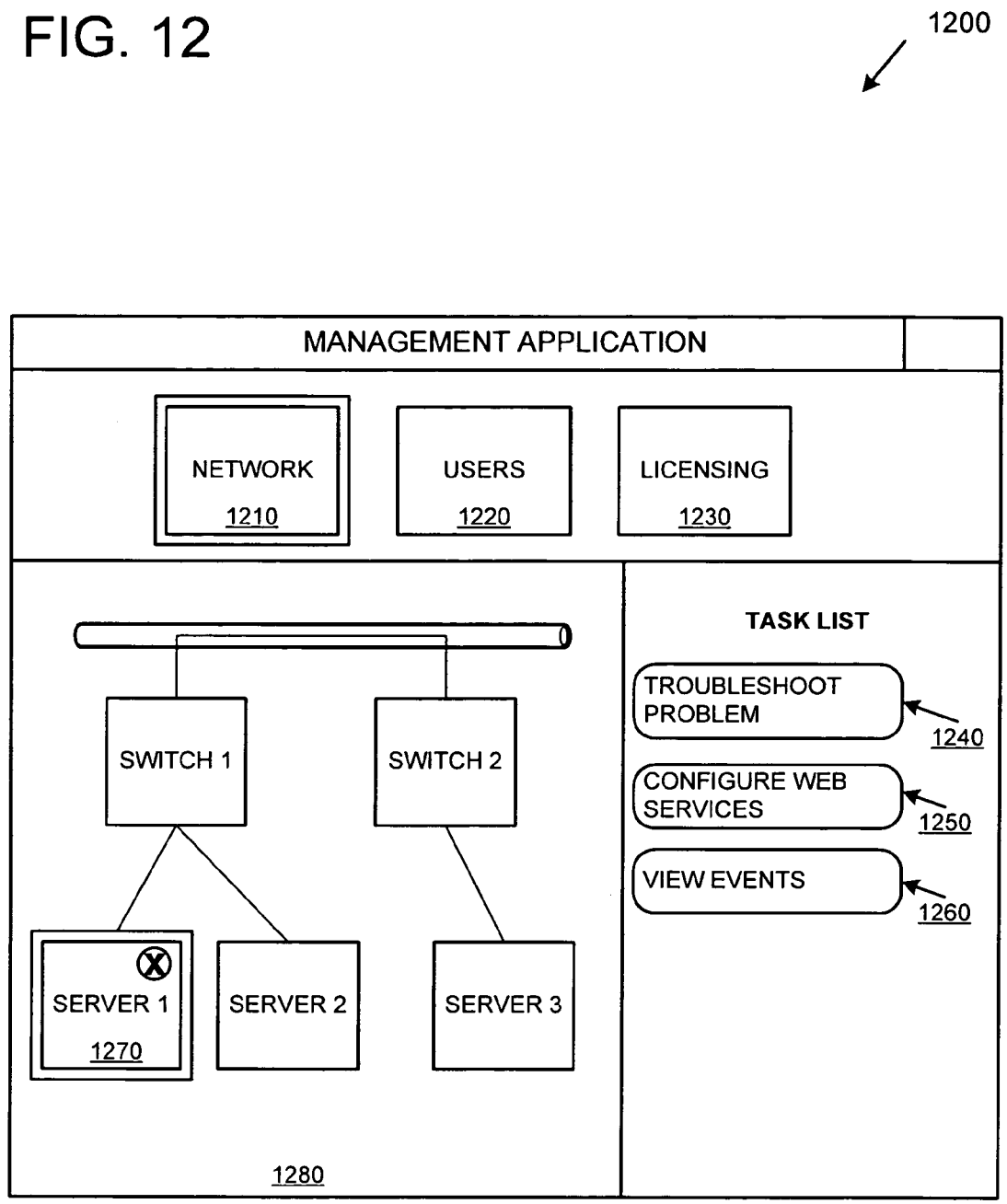
FIG. 12 is a diagram showing an exemplary user interface depicting a problem.

FIG. 12 shows an exemplary user interface 1200 of a management application depicting a problem. The user interface can be displayed, for example, by a system such as that shown in FIG. 2. In the user interface 1200, a number of entity groups are displayed: a network entity group 1210, a users entity group 1220, and a licensing entity group 1230. In the user interface 1200, the network entity group 1210 has been selected.

Based on the selection of the network entity group 1210, a number of entities associated with the network entity group are displayed in a topology view 1280. The topology view 1280 displays the entities as a graphical representation of the entities (e.g., displaying relationships between the entities).

In the topology view 1280, one of the computer servers, "server 1," 1270 is depicted as having a problem. The problem can be indicated, for example, by associating a graphic (e.g., a red "X") with server 1 1270.

In the topology view 1280, server 1 1270 has been selected (e.g., by a user upon noticing that server 1 has a problem). A number of tasks 1240-60 associated with the server 1 1270 are also displayed.

A user of the user interface 1200 can select the "troubleshoot problem" task 1240 to troubleshoot one or more problems associated with the server 1 1270. For example, if the only problem associated with server 1 is that there are outstanding updates awaiting approval, then a user interface identifier can be obtained from a task template associated with the task and passed (along with a context identifier identifying server 1) to a management application causing display of a view targeted user interface displaying a list of updates for server 1 awaiting approval.

If there are multiple problems associated with server 1, then a different approach can be taken. One approach can be to display a targeted user interface displaying a list of problems associated with server 1 (e.g., updates awaiting approval, service not responding, unviewed events) and asking a user which problem to address. A user can select one of the problems which can result in display of a targeted user interface (e.g., by way of a task template).

Another approach can be to display a user interface (e.g., in a separate window) displaying a list of problems associated with server 1 and a corresponding list of tasks to address the problems. A user can then select one of the tasks (e.g., approve updates) to cause display of a targeted user interface (e.g., by way of a task template associated with the selected task). The user interface displaying the list of problems can remain on a display so that the user can return to it to select a different task to address another one of the listed problems.

Example 31

Exemplary Task Template Schema

Figure 13:
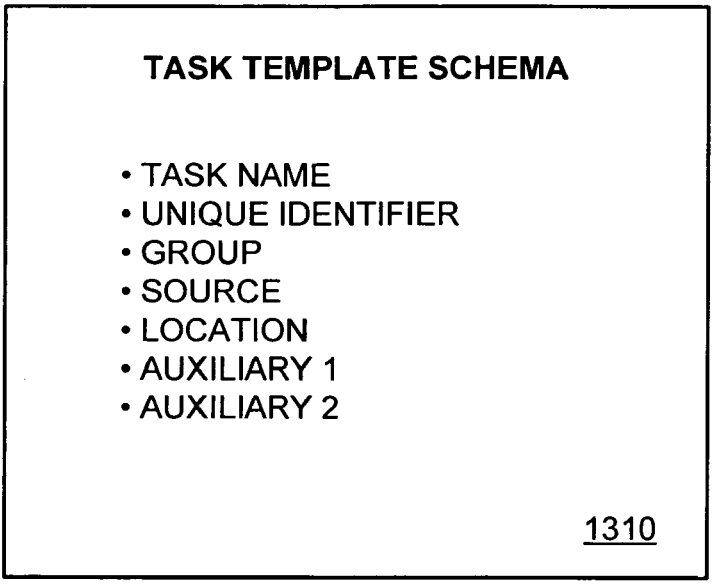
FIG. 13 is a diagram showing an exemplary task template schema.

FIG. 13 shows an exemplary task template schema 1300. The task template schema can comprise various fields 1310. The task template schema can comprise a task name field (e.g., for use when displaying the task template in a user interface for selecting or invoking the task template). The task template schema can comprise a unique identifier field for uniquely identifying the task template. The task template schema can comprise a group identifier for identifying a group of the task template. The task template schema can comprise a source field for identifying a source application. The task template schema can comprise a location identifier field for identifying a user interface of an application (e.g., by way of an API of the application), such as a targeted user interface of a managed application. The task template schema can also comprise auxiliary fields allowing for future expansion of the task template schema.

Example 32

Exemplary User Interface Depicting Display of Task Templates

Figure 14:
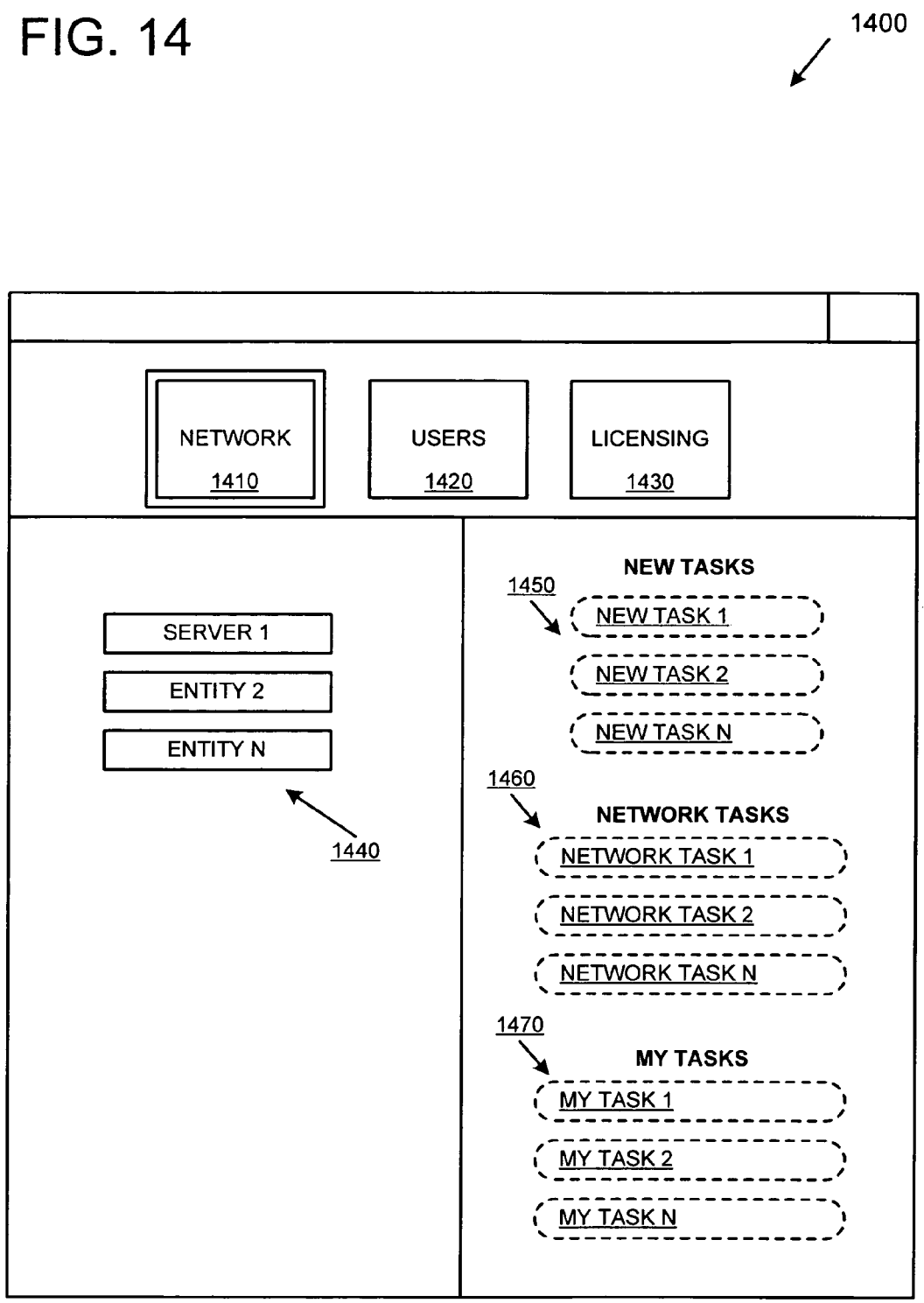
FIG. 14 is a diagram showing an exemplary user interface depicting display of task templates.

FIG. 14 shows an exemplary user interface 1400 depicting display of task templates. The user interface can be displayed, for example, by a system such as that shown in FIG. 2. In the user interface 1400, a number of entity groups are displayed: a network entity group 1410, a users entity group 1420, and a licensing entity group 1430. In the user interface 1400, the network entity group 1410 has been selected. Based on the selected network entity group 1410, a number of entities 1440 associated with the selected network entity group are displayed.

In the user interface 1400, a number of "new tasks" are displayed in a list 1450. For example, the "new tasks" 1450 can be task templates that have been recently updated. The tasks of the "new tasks" list can be scoped tasks, global tasks, or a mixture of both. The management application can use a visual cue, such as an icon, to distinguish a new task from one of the tasks that ships with the management server.

In the user interface 1400, a number of "network tasks" are displayed 1460. The "network tasks" can be scoped tasks displayed based on the selection of the network entity group 1410.

Also displayed in the user interface 1400 are a number of tasks designated "my tasks" 1470. For example, a user of the user interface 1400 (e.g., a user of a management application that operates the user interface) can select a number of task templates for display in the user interface 1400 under a user-defined title, such as "my tasks" 1470. These tasks can represent tasks that the user performs frequently. The tasks of the "my tasks" list 1470 can be scoped tasks, global tasks, or a mixture of both.

Example 33

Exemplary Task Usage System

Figure 15:
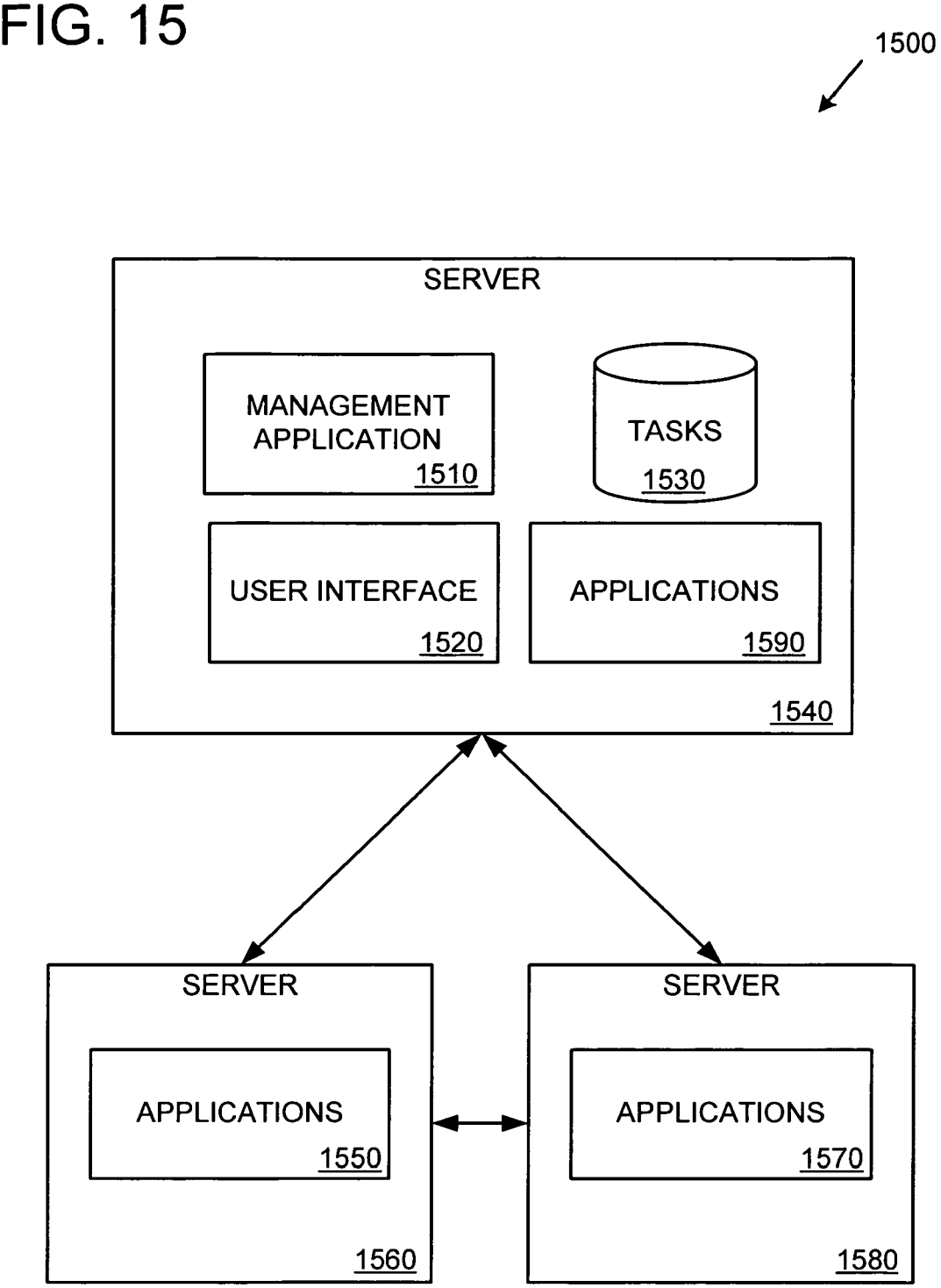
FIG. 15 is a diagram showing an exemplary system for using tasks.

FIG. 15 shows an exemplary system 1500 for using tasks. In the example, a management application 1510 (e.g., a server application) can run on a computer server 1540. For example, the management application 1510 can be an application for managing a collection of applications (e.g., 1550, 1570, and 1590) (e.g., server applications) designed to operate a multi-server computer system (e.g., providing services to a business or organization). The collection of applications (e.g., 1550, 1570, and 1590) can be managed applications. The collection of applications can include, for example, email applications, file serving applications, remote access applications, user management applications, licensing applications, and monitoring applications. Different servers of the multi-server computer system can run different applications from the collection of applications. For example, the multi-server computer system can comprise three servers: a management server (e.g., 1540), an email server (e.g., 1560), and a firewall server (e.g., 1580). The management application 1510 can be located on the management server (e.g., 1540) and manage applications on the same server as well as applications on different servers (e.g., 1560 and 1580).

The management application 1510 can be used to manage servers (e.g., by managing server applications running on the servers) using tasks 1530 (e.g., where the tasks are accomplished by task templates). Tasks 1530 can be stored (e.g., as task templates) in a database on a computer server (e.g., on the same server as the management application, or on a different server). Tasks 1530 can also be stored in other ways (e.g., in a flat file, on removable media, as an XML schema).

The management application 1510 can provide a user interface 1520 allowing a user to access tasks 1530 (e.g., to access task templates for accomplishing the tasks). For example, the user interface 1520 of the management application 1510 can display tasks 1530 (e.g., displayed as user interface elements for initiating the tasks) in a variety of forms, such as a global task list or a scoped task list. The user interface 1520 can also display objects, entities, and entity groups. For example, a user can select an object, entity, or entity group from the user interface 1520 to display scoped tasks.

From the user interface 1520, a user can select (e.g., invoke) a task 1530 (e.g., by selecting a user interface element for initiating the task) to manage (e.g., display information from, make a change to) an application (e.g., a managed application). For example, the user can select a task 1530 to manage applications 1590 on the same computer server 1540 that the management application 1510 is operating on. The user can also select a task 1530 to manage an application on a different computer server (e.g., manage applications 1550 on a computer server 1560, or manage applications 1570 on computer server 1580).

The user interface 1520 can also support different options, procedures, or techniques for navigating to tasks 1530 (e.g., navigating to task templates associated with, and used to accomplish, the tasks). For example, the user interface 1520 can support an option for navigating to a task by displaying a global task (e.g., displaying a global task on a home page of the user interface 1520 where the user has not selected an object, entity, or entity group). The user interface 1520 can support an option for navigating to a task based on a selection of an object, entity, or entity group and then displaying a scoped task.

Example 34

Exemplary Server Applications

In any of the examples herein, server applications can be any software installed on a server. For example, server applications can include any server application offering a service for use by a client. In practice, such server applications can include file sharing services, email servers, licensing services, directory services, firewall services, anti-spam services, anti-virus detection services, networking services (e.g., services for managing identities and relationships that make up a network), and the like.

Server applications can also include operating system programs, such as an operating system, operating system enhancements, or both.

Example 35

Exemplary Multi-Server System for Performing Tasks

Figure 16:
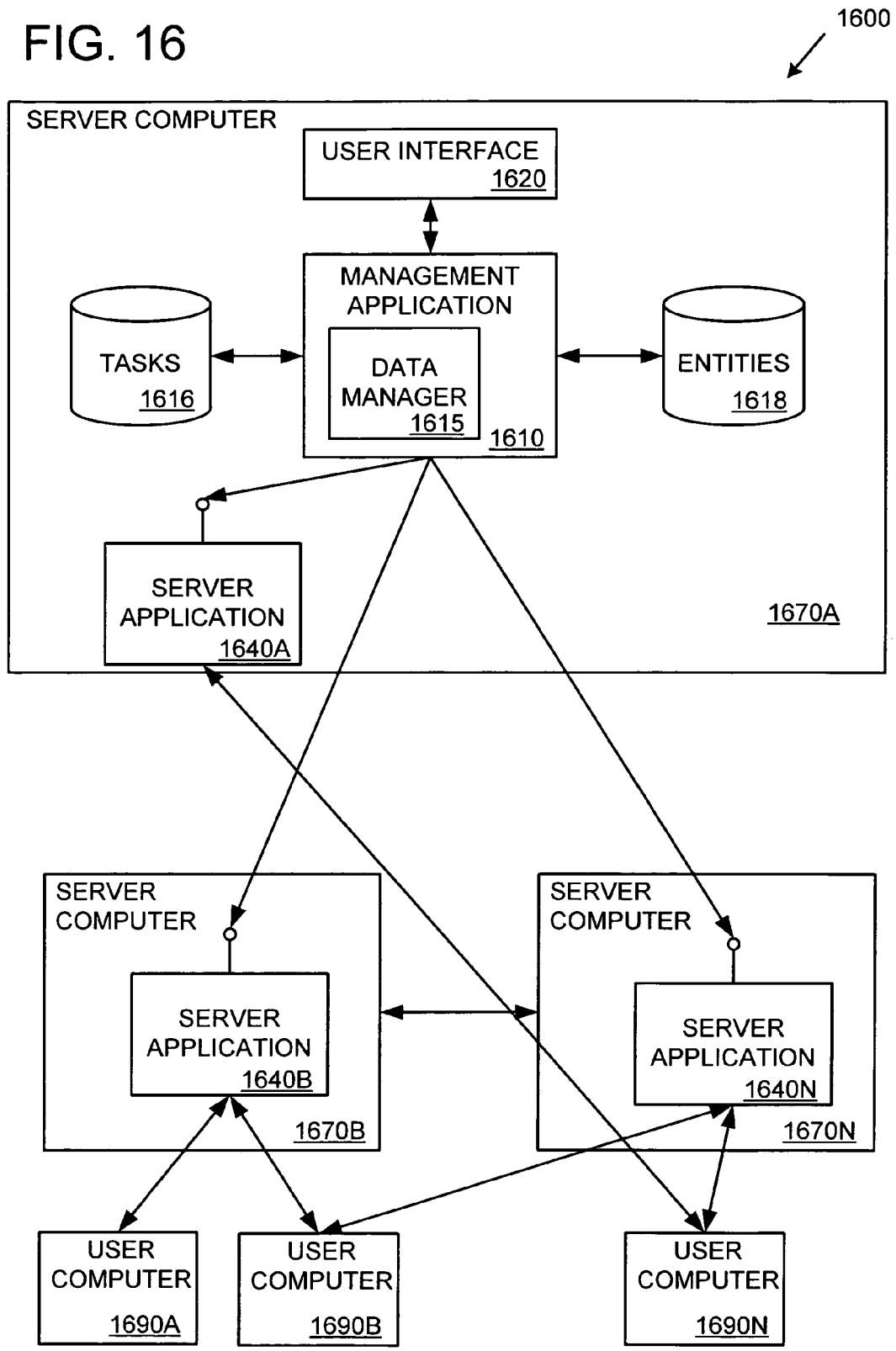
FIG. 16 is a diagram showing an exemplary multi-server system for performing tasks.

FIG. 16 shows an exemplary multi-server system 1600 for performing tasks. In the example, a management application 1610 (e.g., a server application) can run on a computer server 1670A. For example, the management application can comprise a data manager 1615 for managing a number of computer servers by managing server applications on the computer servers (e.g., server application 1640A on server 1670A, server application 1640B on server 1670B, and server application 1640N on server 1670N).

The server applications (1640A-1640N) can include, for example, server applications for providing computer services to a business or organization, such as: email applications, file serving applications, remote access applications, user management applications, licensing applications, anti-virus applications, and monitoring applications. Different servers of the multi-server system can perform specific services for a business or organization by running different server applications. For example, the multi-server system can comprise three servers: a management server (e.g., 1670A) running a file service application (e.g., 1640A), an email server (e.g., 1670B) running an email application (e.g., 1640B), and a firewall server (e.g., 1670N) running an anti-virus application (e.g., 1640N).

The data manager 1615 can manage a server application (e.g., 1640A, 1640B, or 1640N) on a server (e.g., 1670A, 1670B, or 1670N) by communicating with an API of the server application. For example, a user management server application can provide an API for displaying various user interfaces within the user management application (e.g., a user interface for adding users, a user interface for deleting users, and a user interface for resetting a user's password).

The management application 1610 can provide a user interface 1620 allowing a user to manage the servers and applications of the multi-server system 1600 using tasks 1616. For example, the user interface 1620 of the management application 1610 can display tasks 1616 (e.g., displayed as user interface elements for initiating the tasks) in a variety of forms, such as a global task list or a scoped task list. The user interface 1620 can also display entities and entity groups (e.g., from an entities database 1618). For example, a user can select an entity or entity group from the user interface 1620 to display scoped tasks.

The tasks 1616 can be stored (e.g., as task templates) in a database. The task templates can be used to accomplish (e.g., complete) a task by directing a user to a user interface for accomplishing the task. For example, a task template can comprise a location variable, where the location variable represents a user interface of a server application by way of an API of the server application.

For example, the management application 1610 can display, in the user interface 1620, an entity from the entities database 1618, receive a selection of the entity from a user, display a task from the tasks database 1616, and receive a selection of the task from the user. The management application 1610 can then, via the data manager 1615, using a location variable from a task template associated with the selected task, connect to an API of a server application (e.g., 1640A, 1640B, or 1640N) and display a user interface which the user can then use to complete the selected task.

Server applications (e.g., 1640A-N) can also provide services (e.g., email services, file sharing services, user services) to user computers (e.g., 1690A-N).

Example 36

Exemplary Computing Environment

Figure 17:
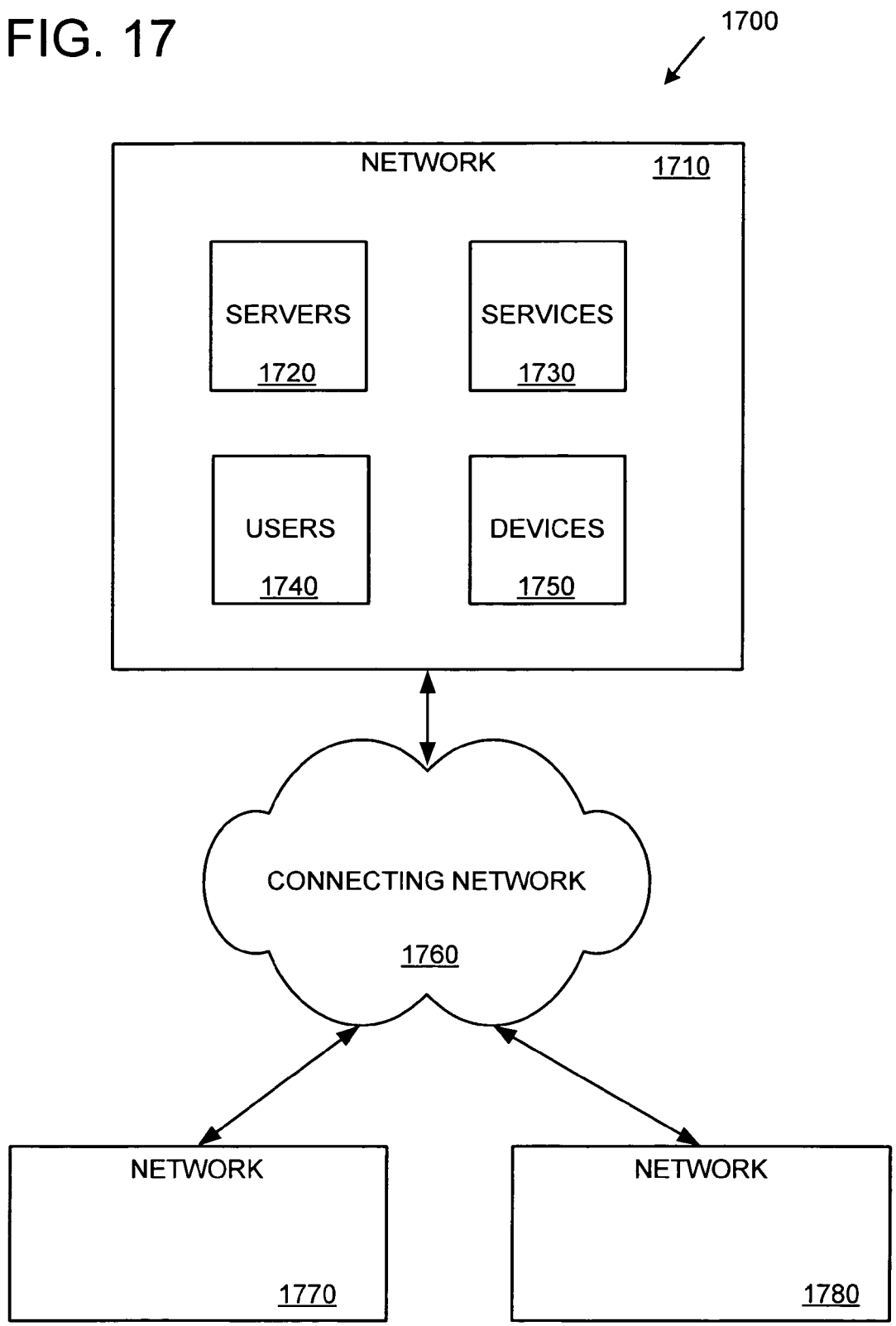
FIG. 17 is a block diagram illustrating an example of a computing environment that can be used to implement any of the technologies described herein.

FIG. 17 illustrates an example computing environment 1700 that can be used to implement any of the technologies described herein. The computing environment includes a network 1710. The network 1710 can comprise servers 1720 (e.g., computer servers), services 1730 (e.g., computer services), users 1740 (e.g., general computer users, IT administrators, employees), and devices 1750 (e.g., desktop or laptop computers, printers, copiers, scanners).

The network 1710 can connect to other networks, such as 1770 and 1780 through in connecting network 1760. For example, the connecting network 1760 can comprise a wide area network such as the Internet or a local network. The connecting network can comprise various network hardware, protocols, and topologies.

Example 37

Exemplary General Purpose Computer System

Figure 18:
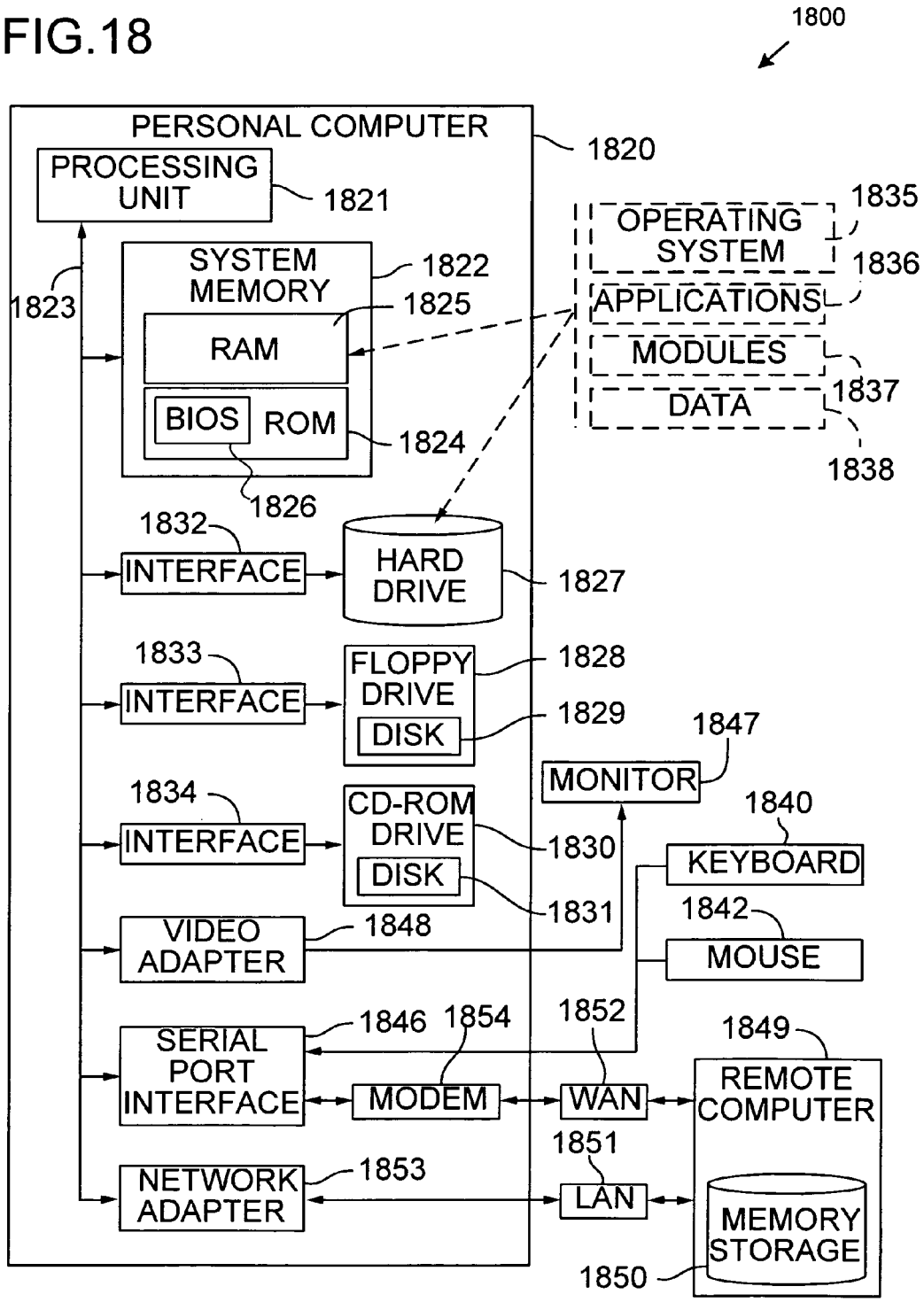
FIG. 18 is block diagram illustrating an example of a computer system that can be used to implement any of the technologies described herein.

FIG. 18 illustrates an example of a computer system 1800 that can be used to implement any of the technologies described herein. The computer system includes a personal computer 1820, including a processing unit 1821, a system memory 1822, and a system bus 1823 that interconnects various system components including the system memory to the processing unit 1821. The system bus may comprise any of several types of bus structures including a memory bus or memory controller, a peripheral bus, and a local bus using a bus architecture such as PCI, VESA, Microchannel (MCA), ISA and EISA, to name a few. The system memory includes read only memory (ROM) 1824 and random access memory (RAM) 1825. A basic input/output system 1826 (BIOS), containing the basic routines that help to transfer information between elements within the personal computer 1820, such as during start-up, is stored in ROM 1824. The personal computer 1820 further includes a hard disk drive 1827, a magnetic disk drive 1828, e.g., to read from or write to a removable disk 1829, and an optical disk drive 1830, e.g., for reading a CD-ROM disk 1831 or to read from or write to other optical media. The hard disk drive 1827, magnetic disk drive 1828, and optical disk drive 1830 are connected to the system bus 1823 by a hard disk drive interface 1832, a magnetic disk drive interface 1833, and an optical drive interface 1834, respectively. The drives and their associated computer-readable media provide nonvolatile storage of data, data structures, computer-executable instructions (program code such as dynamic link libraries, and executable files), etc. for the personal computer 1820. Although the description of computer-readable media above refers to a hard disk, a removable magnetic disk and a CD, it can also include other types of media that are readable by a computer, such as magnetic cassettes, flash memory cards, digital video disks, Bernoulli cartridges, and the like.

A number of program modules may be stored in the drives and RAM 1825, including an operating system 1835, one or more application programs 1836, other program modules 1837, and program data 1838. A user may enter commands and information into the personal computer 1820 through a keyboard 1840 and pointing device, such as a mouse 1842. Other input devices (not shown) may include a microphone, joystick, game pad, satellite dish, scanner, or the like. These and other input devices are often connected to the processing unit 1821 through a serial port interface 1846 that is coupled to the system bus, but may be connected by other interfaces, such as a parallel port, game port or a universal serial bus (USB). A monitor 1847 or other type of display device is also connected to the system bus 1823 via an interface, such as a display controller or video adapter 1848. In addition to the monitor, personal computers typically include other peripheral output devices (not shown), such as speakers and printers.

The personal computer 1820 may operate in a networked environment using logical connections to one or more remote computers, such as a remote computer 1849. The remote computer 1849 may be a server, a router, a peer device or other common network node, and typically includes many or all of the elements described relative to the personal computer 1820, although only a memory storage device 1850 has been illustrated in FIG. 18. The logical connections depicted in FIG. 18 include a local area network (LAN) 1851 and a wide area network (WAN) 1852. Such networking environments are commonplace in offices, enterprise-wide computer networks, intranets and the Internet.

When used in a LAN networking environment, the personal computer 1820 is connected to the local network 1851 through a network interface or adapter 1853. When used in a WAN networking environment, the personal computer 1820 typically includes a modem 1854 or other means for establishing communications over the wide area network 1852, such as the Internet. The modem 1854, which may be internal or external, is connected to the system bus 1823 via the serial port interface 1846. In a networked environment, program modules depicted relative to the personal computer 1820, or portions thereof, may be stored in the remote memory storage device. The network connections shown are merely examples and other means of establishing a communications link between the computers may be used.

Example 38

Exemplary Automated Methods

Any of the methods described herein can be performed via one or more computer-readable media having computer-executable instructions for performing such methods. Operation can be fully automatic, semi-automatic, or involve manual intervention.

Example 39

Exemplary Combinations

The technologies of any example described herein can be combined with the technologies of any one or more other examples described herein.

Example 40

Exemplary Alternatives

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer implemented method for displaying a targeted user interface of a managed application, the method comprising:

displaying, in a user interface of a management application running on a management computer server, one or more tasks;

receiving, via the user interface of the management application, a selection of a task from the one or more tasks;

passing a user interface identifier obtained from a task template associated with the selected task to the managed application, wherein the user interface identifier identifies the targeted user interface of the managed application, wherein the targeted user interface is one of a plurality of graphical user interfaces provided by the managed application, and wherein the task template comprises the user interface identifier;

passing a context identifier associated with the selected task to the managed application, wherein the context identifier identifies a context of the selected task, wherein the context identifier controls the content displayed in the targeted user interface, and wherein the context identifier supports at least the following types of context identifiers:

a context identifier comprising a unique user identifier, wherein the unique user identifier is used to select information related to a specific user associated with the unique user identifier for display in the targeted user interface; and a context identifier comprising a unique computer identifier, wherein the unique computer identifier is used to select information related to a specific computer associated with the unique computer identifier for display in the targeted user interface; and displaying the targeted user interface of the managed application based on the task template associated with the selected task, wherein the targeted user interface of the managed application is displayed at the management computer server;

wherein the managed application is running on a different computer server from the management computer server, wherein the management computer server and the different computer server are connected via a network, wherein the targeted user interface of the managed application is displayed remotely at the management computer server from the different computer server, and wherein the targeted user interface of the managed application is remotely displayed in a display at the management computer server.

2. The method of claim 1 wherein the user interface of the management application is displayed in a first user interface window at the management computer server, and wherein displaying the targeted user interface of the managed application comprises displaying the targeted user interface in a second user interface window at the management computer server.

3. The method of claim 1 wherein displaying the targeted user interface of the managed application comprises passing personalization information from the management computer server to the managed application, and wherein the targeted user interface is personalized based on the personalization information.

4. The method of claim 1 further comprising:
receiving, via the user interface of the management application, a selection of an object from one or more objects displayed in the user interface of the management application;
wherein the one or more tasks are associated with the selected object, and wherein the one or more tasks are displayed in response to receiving the selection of the object.

5. The method of claim 1 further comprising:
displaying, in the user interface of the management application, an indication of a problem with an object; and
receiving, via the user interface of the management application, a selection of the object;
wherein the one or more tasks are displayed in response to receiving the selection of the object.

6. A computer implemented method for displaying a targeted user interface of a managed application at a management computer server, the method comprising:
displaying, in a user interface of a management application running on the management computer server, one or more tasks;
receiving, via the user interface, a selection of a task from the one or more tasks;
choosing a task template associated with the selected task, wherein the task template comprises a user interface identifier, wherein the user interface identifier identifies the targeted user interface of the managed application; and
based on the chosen task template, displaying the targeted user interface of the managed application at the management computer server, wherein displaying the targeted user interface of the managed application at the management computer server comprises passing the user interface identifier obtained from the task template to the managed application, wherein the targeted user interface is one of a plurality of graphical user interfaces provided by the managed application;

wherein displaying the targeted user interface of the managed application at the management computer server further comprises passing a context identifier associated with the selected task to the managed application, wherein the context identifier identifies a context of the selected task, wherein the context identifier controls content displayed in the targeted user interface, and wherein the context identifier supports at least the following types of context identifiers:
a context identifier comprising a unique user identifier, wherein the unique user identifier is used to select information related to a specific user associated with the unique user identifier for display in the targeted user interface; and
a context identifier comprising a unique computer identifier, wherein the unique computer identifier is used to select information related to a specific computer associated with the unique computer identifier for display in the targeted user interface;
wherein the managed application is running on a different computer server from the management computer server, wherein the management computer server and the different computer server are connected via a network, and wherein the targeted user interface of the managed application is displayed remotely at the management computer server from the different computer server.

7. The method of claim 6 further comprising:
receiving, via the user interface of the management application, a selection of an object from one or more objects displayed in the user interface of the management application;
wherein the one or more tasks are associated with the selected object, and wherein the one or more tasks are displayed in response to receiving the selection of the object.

8. The method of claim 7 wherein the task template is one of a plurality of task templates associated with the selected task, and wherein choosing the task template comprises choosing the task template from the plurality of task templates based on status information of the selected object.

9. The method of claim 7 wherein the task template is one of a plurality of task templates associated with the selected task, and wherein choosing the task template comprises:
analyzing status information of the selected object; and
based on a result of the analysis of the status information, choosing the task template from the plurality of task templates.

10. The method of claim 6 wherein the task template is one of a plurality of task templates associated with the selected task, and wherein choosing the task template comprises choosing the task template from the plurality of task templates based on status information of one or more objects associated with the selected task.

11. The method of claim 6 wherein choosing the task template comprises choosing the task template from a plurality of task templates associated with the selected task by evaluating one or more task rules.

12. The method of claim 11 wherein evaluating the one or more task rules comprises:
receiving status information of one or more objects associated with the selected task; and
evaluating the one or more task rules based on the status information of the one or more objects.

13. A computer implemented method for managing a managed application from a management computer server by displaying a targeted user interface of the managed application at the management computer server, the method comprising:
- displaying, via a user interface of a management application running on the management computer server, one or more objects;
- receiving, from a user via the user interface of the management application, a selection of an object from the one or more objects;
- displaying, in the user interface of the management application, one or more tasks associated with the selected object;
- receiving, from a user via the user interface of the management application, a selection of a task from the one or more tasks;
- choosing a task template from one or more task templates associated with the selected task;
- passing a user interface identifier obtained from the task template to the managed application, wherein the user interface identifier identifies the targeted user interface of the managed application, wherein the targeted user interface is one of a plurality of graphical user interfaces provided by the managed application, and wherein the task template comprises the user interface identifier;
- passing a context identifier associated with the selected object to the managed application, wherein the context identifier identifies a context of the selected object, wherein the context identifier controls the content displayed in the targeted user interface, and wherein the context identifier supports at least the following types of context identifiers:
  - a context identifier comprising a unique user identifier, wherein the unique user identifier is used to select information related to a specific user associated with the unique user identifier for display in the targeted user interface; and
  - a context identifier comprising a unique computer identifier, wherein the unique computer identifier is used to select information related to a specific computer associated with the unique computer identifier for display in the targeted user interface; and
- based on the chosen task template, displaying the targeted user interface of the managed application at the management computer server;
- wherein the managed application is running on a different computer server from the management computer server, wherein the management computer server and the different computer server are connected via a network, and wherein the targeted user interface of the managed application is displayed remotely at the management computer server from the different computer server.

14. The method of claim 13 wherein choosing the task template from the one or more task templates associated with the selected task comprises:
- receiving status information of the selected object; and
- evaluating one or more task rules based on the received status information.

15. The method of claim 1 wherein the task template associated with the selected task comprises a location variable, wherein the location variable stores the user interface identifier.

* * * * *